(12) United States Patent
Gritti et al.

(10) Patent No.: US 11,285,403 B2
(45) Date of Patent: Mar. 29, 2022

(54) HIGH RESOLUTION AND SEMI-PREPARATIVE RECYCLING CHROMATOGRAPHY SYSTEM FOR ISOLATION AND PREPARATION OF UNKNOWN TRACE IMPURITIES IN PHARMACEUTICAL PRODUCTS

(71) Applicant: Waters Technologies Corporation, Milford, MA (US)

(72) Inventors: Fabrice Gritti, Franklin, MA (US); Sylvain Cormier, Mendon, MA (US)

(73) Assignee: Waters Technologies Corporation, Milford, MA (US)

( * ) Notice: Subject to any disclaimer, the term of this patent is extended or adjusted under 35 U.S.C. 154(b) by 221 days.

(21) Appl. No.: 16/426,320

(22) Filed: May 30, 2019

(65) Prior Publication Data
US 2019/0366234 A1  Dec. 5, 2019

Related U.S. Application Data

(60) Provisional application No. 62/678,469, filed on May 31, 2018.

(51) Int. Cl.
*B01D 15/16* (2006.01)
*B01D 15/18* (2006.01)
(Continued)

(52) U.S. Cl.
CPC ....... *B01D 15/1814* (2013.01); *B01D 15/161* (2013.01); *B01D 15/1871* (2013.01);
(Continued)

(58) Field of Classification Search
CPC .............. B01D 15/1814; B01D 15/161; B01D 15/1871; B01D 15/163; B01D 15/40; G01N 30/44; G01N 30/461; G01N 2030/8872
See application file for complete search history.

(56) References Cited

U.S. PATENT DOCUMENTS 5,630,943 A * 5/1997 Grill ................. B01D 15/1814
                                                        210/198.2
6,972,327 B1   12/2005 Madan et al.
(Continued)

OTHER PUBLICATIONS

Lan, K., and Jorgenson, J., "Pressure-induced retention variations in reversed-phase alternate-pumping recycle chromatography", Analytical Chemistry, 70, pp. 2773-2782. (Year: 1998).*
(Continued)

*Primary Examiner* — Benjamin L Lebron
(74) *Attorney, Agent, or Firm* — Womble Bond Dickinson (US) LLP; Deborah M. Vernon; Mark R. DeLuca

(57) ABSTRACT

The disclosure relates to a recycling chromatography method that includes injecting a sample into a mobile phase flow stream of a chromatography system to create a combined flow stream. The sample includes an API and at least one impurity. The chromatography system includes a first column and a column in series, a first valve in fluid communication with the first and second chromatographic columns, a heater in communication with the first and second chromatographic columns, a fraction collector in fluid communication with the first and second chromatographic columns, and a second valve positioned before the fraction collector. The combined flow stream is recycled from the first chromatographic column to the second chromatographic column and vice versa by switching the first valve until a baseline resolution is achieved to separate the at least one impurity from the API. The at least one impurity is collected in the fraction collector.

19 Claims, 23 Drawing Sheets

(51) Int. Cl.
    *B01D 15/40* (2006.01)
    *G01N 30/44* (2006.01)
    *G01N 30/46* (2006.01)
    *G01N 30/88* (2006.01)

(52) U.S. Cl.
    CPC ........... *G01N 30/44* (2013.01); *G01N 30/461* (2013.01); *B01D 15/163* (2013.01); *B01D 15/40* (2013.01); *G01N 2030/8872* (2013.01)

(56) References Cited

U.S. PATENT DOCUMENTS

| | | |
|---|---|---|
| 9,322,815 B2 | 4/2016 | Srinivasan et al. |
| 2005/0121392 A1 | 6/2005 | Hoffman |
| 2012/0048788 A1 | 3/2012 | Shaimi |

OTHER PUBLICATIONS

Monet-Dedreuil, T., "Impurity isolation and sample purification", Outsourcing-pharma.com. May 8. (Year: 2016).*

Gritt, F., "Think Twice", The Analytical Scientist. Nov. 7. (Year: 2018).*

Araújo et al. "Chiral separation by two-column semi-continuous, open-loop simulated moving-bed chromatography." J. Chromatogr. A. 1217(2010): 5407-5419.

Catchpoole et al. "Visualising the onset of viscous fingering in chromatography columns." J. Chromatogr. A. 1117(2006): 137-145.

Chowdhury. Solar Degradation of Estrone and 17-Estradiol (Ph.D thesis), The University of Western Ontario, London, 2010.

Görög. "Critical review of reports on impurity and degradation product profiling in the last decade." TrAC. 101(2018): 2-16.

Grill et al. "Resolution of a racemic pharmaceutical intermediate. A comparison of preparative HPLC, steady state Yecycling and simulated moving bed." J. Chromatogr. A. 1026(2004): 101-108.

Grill. "Separation of a racemic pharmaceutical intermediate using closed-loop steady state recycling." J. Chromatogr. A. 827(1998): 359-371.

Gritti et al. "Accurate measurement of dispersion data through short and narrow tubes used in very high-pressure liquid chromatography." J. Chromatogr. A. 1410(2015): 118-128.

Gritti et al. "Applications of high-resolution recycling liquid chromatography: From small to large molecules." J. Chromatogr. A. 1524(2017): 108-120.

Gritti et al. "Ideal versus real automated twin col. recycling chromatography process." J. Chromatogr. A. 1508(2017): 81-94.

Gritti et al. "Performance optimization of ultra high-resolution recycling liquid chromatography." J. Chromatogr. A. 1532(2018): 74-88.

Iguiniz et al. "Two-dimensional liquid chromatography in pharmaceutical analysis. Instrumental aspects, trends and applications." J. Pharm. Biomed. Anal. 145(2017): 482-503.

Juza et al. "Simulated moving-bed chromatography and its application to chirotechnology." Trends Biochem. 18(2000): 108-118.

Krättli et al. "Online control of the twin-column countercurrent solvent gradient process for biochemistry." J. Chromatogr. A. 1293(2013): 51-59.

Kumar et al. "A validated ultra high-pressure liquid chromatography method for separation of candesartan cilexetil impurities and its degradents in drug product." Pharm. Methods. 3.1(2012): 31-39.

Martin et al. "Effects of high pressue in liquid chromatography." J. Chromatogr. A. 1090(2005): 16-38.

Mayfield et al. "Viscous fingering induced flow instability in multidimensional liquid chromatography." J. Chromatogr. A. 1080(2005): 124-131.

Mazzeo et al. "Advancing LC performance with smaller particles and higher pressure." Anal. Chem. 77(2005): 460A-467A.

Milanowski et al. "Trace Impurity Identification." Contract Pharma. (2011): 70-73.

Mishra et al. "Influence of miscible viscous fingering with negative log-mobility ratio on spreading of adsorbed analytes." Chem. Eng. Sci. 65(2010): 2392-2398.

Morissette et al. "Trace level determination of chloroacetyl chloride and degradation products by derivatization gas chromatography." J. Pharm. Biomed. Anal. 148(2018): 93-99.

Mun. "Partial port-closing strategy for obtaining high throughput or high purities in a four-zone simulated moving bed chromatography for binary separation." J. Chromatogr. A.1217.42(2010): 6522-6530.

Nagy et al. "Protocol for the purification of protected carbohydrates: toward coupling automated synthesis to alternate-pump recycling high-performance liquid chromatography." Chem. Commun. 52(2016): 13253-13256.

Nowak et al. "Theoretical study of using simulated moving bed chromatography to separate intermediately eluting target compounds." J. Chromatogr. A. 1253(2012): 58-70.

Quinones et al. "Modeling of separations by closed-loop steady-state recycling chromatography of a racemic pharmaceutical intermediate." J. Chromatogr. A. 867(2000): 1-21.

Rauf et al. "Spectroscopic studies of keto-enol tautomeric equilibrium of azo dyes." RSC Adv. 5.23(2015): 18097.

Rousseaux et al. "Viscous fingering in packed chromatographic columns: Linear stability analysis." J. Chromatogr. A. 1149(2007): 254-273.

Rousseaux et al. "Viscous fingering in packed chromatographic columns: Non-linear dynamics." J. Chromatogr. A. 1218(2011): 8353-8361.

Shalliker et al. "Reproducibility of the finger pattern in viscous fingering." J. Chromatogr. A. 1161(2007): 121-131.

Shalliker et al. "Understanding the importance of the viscosity contrast between the sample solvent plug and the mobile phase and its potential consequence in two-dimensional high-performance liquid chromatography." J. Chromatogr. A. 1216(2009): 787-793.

Trone et al. "Semi-automated peak trapping recycle chromatography instrument for peak purity investigations." J. Chromatogr. A. 1133(2006): 104-111.

West et al. "Interest of archiral-achiral tandem cols. for impurity profiling of synthetic drugs with supercritical fluid chromatography." J. Chromatogr. A. 1534(2018): 161-169.

Yan et al. "Rapid and high throughput separation technologies—Steady state recycling and supercritical fluid chromatography for chiral resolution of pharmaceutical intermediates." J. Chromatogr. A. 1156(20007): 220-227.

Bombaugh et al. "Application of gel chromatography to small molecules." J. Sep. Sci. 3(1968): 375-392.

Bombaugh et al. "High Resolution Gel Ppermeation Chromatography—Using Recycle." J. Sep. Sci. 5(1970): 751-763.

Bombaugh. "Recent developments in gel permeation chromatography: high speed and high resolution." J. Chromatogr. A. 53(1970): 27-35.

Chizhkov et al. "Preparative-scale circulation gas chromatography." J. Chromatogr. A. 120(1976): 35-45.

Dingenen et al. "Preparative chromatographic resolution of racemates on chiral stationary phases on laboratory and production scales by closed-loop recycling chromatography" J. Chromatogr. A. 666(1994): 627-650.

Duvdevani et al. "Recycle gel permeation chromatography. III. Design modifications and some results with polycarbonate." J. Polymer Sci. Part B. 9(1971): 429-434.

Fanigliulo et al. "Kinetic performance of reversed-phase C18 high-performance liquid chromatography columns compared by means of the Kinetic Plot." J. Chromatogr. A. 1218.21(2011): 3351-3359.

Grill. "Closed-loops recycling with periodic intra-profile injection: a new binary preparative chromatography technique." J. Chromatogr. A. 796(1998): 101-113.

Knox et al. "B and C terms in the Van Deemter equation for liquid-chromatography." J. Chromatogr. A. 282(1983): 297-313.

Aspanut et al. Developmeny of a Solvent-Saving Direct-Pumping Recycle Chromatographic Systema and Its Application to the Separation of Deuterated Benzenes in Liquid Chromatography. Chromatogr. 28(2007): 131-135.

(56) References Cited

OTHER PUBLICATIONS

Lim et al. "Separation of benzene and deuterated benzenes by reversed-phase and recycle liquid chromatography using monolithic capillary columns." J. Sep. Sci. 27(2004): 1339-1344.

Liu et al. "Improved enantioseparation via the twin-column based recycling high performance liquid chromatography." J. Chromatogr. A 1363(2014): 236-241.

MacNair et al. "Ultrahigh-pressure reversed-phase capillary liquid chromatography: isocratic and gradient elution using columns packed with 1.0 mm particles." Anal. Chem. 71(1999): 700-708.

Mellors et al. "Use of 1.5 mm porous ethyl-bridged hybrid particles as a stationary-phase support for reversed-phase ultrahigh-pressure liquid chromatography." Anal. Chem. 76(2004): 5441-5450.

Zhao et al. "Synchronous Cyclic Capillary Electrophoresis Using Conventional Capillaries: System Design and Preliminary Results." J. Microcolumn Sep. 11, 1999: 431-437.

\* cited by examiner

HIGH RESOLUTION AND SEMI-PREPARATIVE RECYCLING CHROMATOGRAPHY SYSTEM FOR ISOLATION AND PREPARATION OF UNKNOWN TRACE IMPURITIES IN PHARMACEUTICAL PRODUCTS

CROSS REFERENCE TO RELATED APPLICATIONS

This application claims benefit of and priority to U.S. provisional patent application No. 62/678,469 filed May 31, 2018 entitled "High Resolution and Semi-Preparative Recycling Chromatography System for Isolation and Preparation of Unknown Trace Impurities in Pharmaceutical Products," the entire contents of which is hereby incorporated herein in its entirety.

FIELD OF THE TECHNOLOGY

The present disclosure relates to high resolution and semi-preparative recycling chromatography methods and systems for isolation and preparation of unknown trace impurities in pharmaceutical products. More specifically, the present disclosure relates to methods and devices based on an assembly of an integrated chromatographic instrument for the isolation and preparation of an unknown trace impurity from a concentrated solution of an active pharmaceutical ingredient ("API").

BACKGROUND

The isolation and preparation of about 1 mg of unknown impurities present in concentrated drug solutions is required by the pharmaceutical industry for identification. Unambiguous structure elucidation is commonly achieved by liquid state nuclear magnetic resonance (NMR) experiments with about 1 mg of material. However, serious separation and production problems arise when the targeted impurity nearly co-elutes with the active pharmaceutical ingredient, its relative abundance is very small (for example, less than about 1/100), the sample diluent is much stronger than the eluent, viscous fingering occurs, the yield should be larger than 99%, and when the purity level required for successful NMR experiments is larger than 90%. For the lack of sufficient resolution, standard preparative processes such as batch chromatography, simulated mobbing bed (SMB), stead state recycling (SSR), or multi-column countercurrent solvent gradient cannot fully solve this problem.

SUMMARY

The present technology solves the problems of the prior art by combining high resolution performance with semi-preparative capabilities into a single purification process. In essence, these two characteristics are antagonist: preparative chromatography faces large volumes and high concentrations, while high resolution chromatography handles small and diluted samples. Complex separation problems can be solved by alternate pumping or twin column recycling liquid chromatography (TCRLC). The general principle of TCRLC is to virtually increase the column length while still operating at optimum velocity and standard pressure. Even though the production rate of such discontinuous TCRLC is clearly lower than that of continuous SMB or semi-continuous SSR processes, it has several advantages including (1) the experimental set-up can be easily assembled, (2) it can solve extremely challenging separation problems (selectivity factor $\alpha<1.2$ with analyte to analyte abundance ratio $<1/100$, (3) it can cope with strong sample diluent and viscous fingering effects by applying a large enough number of cycles, and (4) its long-time automation can be maintained by maintaining steady the eluent and column temperature. For these reasons, a TCRLC process coupled with a fraction collector is a solution to critical separation problems such as those faced by the pharmaceutical industry.

In one aspect the technology relates to a recycling chromatography method that includes the step of injecting a sample into a mobile phase flow stream of a chromatography system to create a combined flow stream. The sample includes an active pharmaceutical ingredient and at least one impurity. The chromatography system includes (1) a first chromatographic column and a second chromatographic column positioned in series; (2) a first valve in fluid communication with the first chromatographic column and the second chromatographic column; (3) a heater in communication with the first chromatographic column and the second chromatographic column; (4) a fraction collector in fluid communication with the first chromatographic column and the second chromatographic column; and (5) a second valve positioned before the fraction collector. The combined flow stream is recycled from the first chromatographic column to the second chromatographic column and from the second chromatographic column to the first chromatographic column by switching the first valve until a baseline resolution is achieved to separate the at least one impurity from the active pharmaceutical ingredient. The at least one impurity is collected in the fraction collector. The recycling chromatography method can include one or more of the following embodiments.

The chromatography system can be a liquid chromatography system, a gas chromatography system, a supercritical fluid chromatography system, or a capillary electrophoresis chromatography system. In some embodiments, the chromatography system is a semi-preparative chromatography system. The chromatography system can be a semi-preparative, high performance liquid chromatography system.

In some embodiments, the first chromatographic column and the second chromatographic column are identical.

The first valve can be a six-port or an eight-port valve. In some embodiments, the first valve is a six-port valve when no detection is performed between the two columns and the first valve is an eight-port valve when a detection cell is placed between the two columns. The second valve can be a four-port valve.

In some embodiments, the at least one impurity is a trace impurity.

The fraction collector can collect about 1 mg of the at least one impurity at a purity level of at least 90%.

In some embodiments, the method also includes determining the chemical structure of the at least one impurity. The chemical structure of the at least one impurity can be determined by nuclear magnetic resonance.

The method can also include pre-determining a number of valve switches to achieve the baseline resolution to separate the at least one impurity from the active pharmaceutical ingredient. In some embodiments, the method also includes repeating the injecting, recycling and collecting steps until about 1 mg of the at least one impurity is collected in the fraction collector.

In some embodiments, the selectivity factor of the active pharmaceutical ingredient and the at least one impurity is <1.2. In other embodiments, the selectivity factor of the active pharmaceutical ingredient and the at least one impurity is <1.1.

The heater can maintain a column temperature between about 20° C. to about 100° C.

In some embodiments, the combined flow stream has a flow rate between about 0.5 mL/min and about 2 mL/min and the first chromatographic column and the second chromatographic column each have an inner diameter of about 4.6 mm. In some embodiments, the combined flow stream has a flow rate between about 2 mL/min and about 10 mL/min and the first chromatographic column and the second chromatographic column each have an inner diameter of about 1 cm.

In some embodiments, the chromatography system also includes a detector positioned between the first chromatographic column and the second chromatography column. The chromatography system can also include a detector positioned before the fraction collector.

In some embodiments, the collected at least one impurity is about 90% pure. The collected at least one impurity can be about 95% pure. In some embodiments, the collected at least one impurity is about 99% pure.

In another aspect, the technology relates to a recycling chromatography system for separating an active pharmaceutical ingredient and at least one impurity. The recycling chromatography system includes an injector for injecting a sample into a mobile phase flow stream creating a combined flow stream. The recycling chromatography system also includes a first chromatographic column and a second chromatographic column positioned in series and downstream of the injector. A first valve is in fluid communication with the first chromatographic column and the second chromatographic column. A heater is in communication with the first chromatographic column and the second chromatographic column. The recycling chromatography system also includes a fraction collector in fluid communication with the first chromatographic column and the second chromatographic column. A second valve is positioned before the fraction collector. The recycling chromatography system can include one or more embodiments described herein.

The recycling chromatography system can also include a detector positioned between the first chromatographic column and the second chromatographic column.

The chromatography system can be a liquid chromatography system, a gas chromatography system, a supercritical fluid chromatography system, or a capillary electrophoresis chromatography system. In some embodiments, the chromatography system is a semi-preparative chromatography system. The recycling chromatography system can be a semi-preparative, high performance liquid chromatography system.

In some embodiments, the first chromatographic column and the second chromatographic column are identical. For example, the first chromatographic column and the second chromatography column can have the same length and inner diameter and have the same stationary phase material.

The first valve can be a six-port or an eight-port valve. In some embodiments, the first valve is a six-port valve when no detection is performed between the two columns and the first valve is an eight-port valve when a detection cell is placed between the two columns. The second valve can be a four-port valve.

The heater can maintain a column temperature between about 20° C. to about 100° C.

BRIEF DESCRIPTION OF THE DRAWINGS

The technology will be more fully understood from the following detailed description taken in conjunction with the accompanying drawings, in which:

FIG. 12A shows a photo diode array max plot.

FIG. 12B shows a total ion chromatogram.

FIG. 12C shows single ion monitoring (SIM) chromatogram.

FIG. 12D shows single ion monitoring (SIM) chromatogram

DETAILED DESCRIPTION

The technology relates to chromatographic methods and systems that combine high resolution performance with semi-preparative capabilities into a single purification process. In essence, these two characteristics are antagonist: preparative chromatography faces large volumes and high concentrations, while high resolution chromatography handles small and diluted samples. Complex separation problems can be solved by alternate pumping or twin column recycling liquid chromatography (TCRLC). The general principle of TCRLC is to virtually increase the column length while still operating at optimum velocity and standard pressure. A TCRLC process coupled with a fraction collector is a solution to critical separation problems such as those faced by the pharmaceutical industry.

Figure 1:
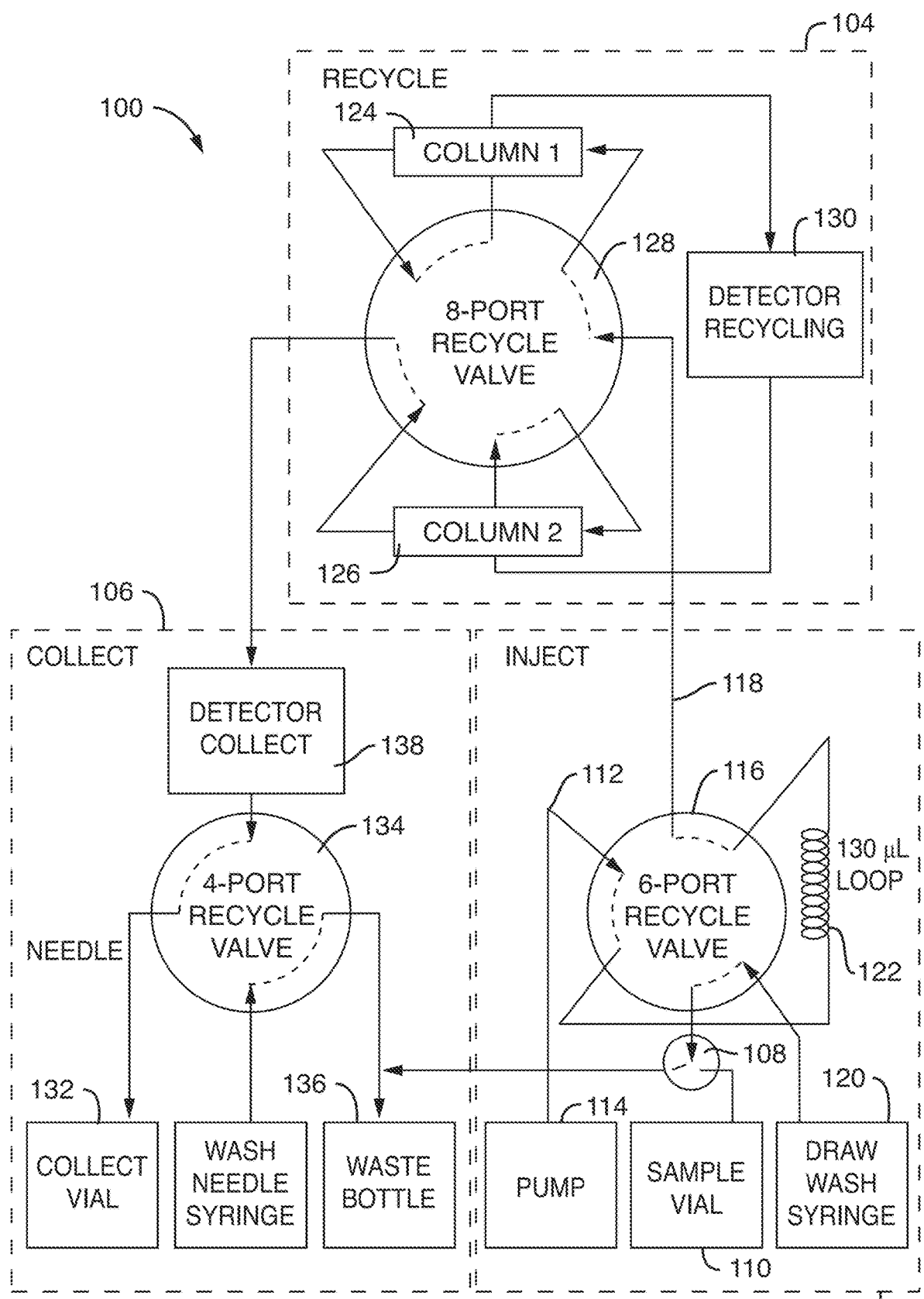
FIG. 1 is a schematic diagram of a semi-preparative, high resolution twin column recycling liquid chromatography system, according to an illustrative embodiment of the technology.

FIG. 1 is a schematic diagram of a semi-preparative, high resolution twin column recycling chromatography system 100. The system 100 can be a liquid chromatography system, a gas chromatography system, a supercritical fluid chromatography system, or a capillary electrophoresis chromatography system. The system 100 can be an analytical chromatography system or a semi-preparative chromatography system. In some embodiments, the system 100 is a semi-preparative, high performance liquid chromatography system.

The system 100 consists of three subunits, an injection subunit 102, a recycling subunit 104, and a collection subunit 106. The injection subunit 102 includes an injector 108 for injecting a sample from a sample vial 110 or a sample manager (not shown) into a mobile phase flow stream 112. In embodiments where a sample manager is used, the sample manager can include, for example, 10 mL sample vials.

The mobile phase is pumped into the system 100 by pump 114 and flows into an injection valve 116. The pump 114 can be a binary solvent pump that can pump up to about 5 mL/min of mobile phase into the chromatography system at a maximum pressure of about 600 bar.

The injection valve 116 can be, for example, a rotary valve and can have six ports. The injection valve 116 can be a spool valve, a linear valve, or a rotary valve. The valve 116 can be, for example, a rotary shear valve. The valve 116 can be a low-dispersion valve. The injection valve 116 can allow the sample to mix with the mobile phase flow stream 112 forming a combined flow stream 118, prior to entering the chromatographic columns. The injection valve 116 can be actuated to a first position to draw up mobile phase and to a second position to inject the sample and to draw up wash solution 120 between chromatographic runs. In some embodiments, the injection subunit 102 includes an extension loop 122. The extension loop 122 can be used to increase the sampled volume.

The recycling subunit 104 includes a first chromatographic column 124 and a second chromatographic column 126. The first and second chromatographic columns 124, 126 are located downstream of the injector 108 and after the sample and mobile phase combine to form the combined flow stream 118. The chromatographic columns 124, 126 can be identical or substantially identical. For example, the first and second chromatographic columns 124, 126 can have the same length, inner diameter and packing material. The specific length, inner diameter, packing material, and other parameters of the columns 124, 126 will be known to those of skill in the art based on the specific separation to be run. For example, when the combined flow stream 118 has a flow rate between about 0.5 mL/min. and about 2 mL/min, then the first and second chromatographic columns 124, 126 can each have an inner diameter of about 4.6 mm. In another example, when the combined flow stream 118 has a flow rate between about 2 mL/min. and about 10 mL/min, then the first and second chromatographic columns 124, 126 can each have an inner diameter of about 1 cm. The columns can be packed with 3-5 µm particles.

A recycling (or first) valve 128 can be located between the first and second columns 124, 126 and can be in fluid communication with the first and second columns 124, 126. The valve 128 can be, for example, a rotary valve. The valve 128 can be a spool valve, a linear valve, or a rotary valve. The valve 128 can be, for example, a rotary shear valve. The valve 128 can be actuated between a first position and a second position to recycle the combined flow stream 118 from the first chromatographic column 124 to the second chromatographic column 126 and from the second chromatographic column 126 to the first chromatographic column 124 until a baseline resolution is achieved. This mimics an infinitely long column that can still be operated at optimum velocity and low pressures. The entire chromatographic band of the targeted impurity can be recycled as many times as necessary between the twin columns until it is fully separated from that of the main drug and of other non-targeted impurities.

In some embodiments, a recycling detector 130 can be positioned between the first chromatographic column 124 and the second chromatographic column 126. The detector 130 can be used, for example, to determine whether the sample has been separated. The detector 130 can also be used to define the time of the valve movement. Once the timing has been set the detector 130 can be removed from the system. When a detector 130 is used in the chromatography system 100, the valve 128 can be an eight-port valve. In embodiments where no detector is positioned between the two columns 124, 126, then the valve 128 can be a six-port valve. Where the number of valve switches has been predetermined based on experimental data or theoretical calculations, the detector between the chromatographic columns can be eliminated.

The chromatography system can include a heater (not shown) in communication with the first and second chromatographic columns 124, 126. The heater can be, for example, a two column oven with active eluent preheaters. The heater can maintain the column temperature between about 20° C. to about 100° C. The heater can maintain the column temperature at 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 46° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C., or 100° C. These values can be used to form a range.

The chromatography system can also include a column manager (not shown) that is in communication with the first and second chromatographic columns 124, 126, the heater, and the valve 128. The column manager can include a computer that is loaded with software to allow the column manager to manage, for example, the valve switch times and the column temperature. The column manager can control and maintain the temperature of the columns and the mobile phase entering the column with a precision of about 0.1° C. As a result, the retention times of both the impurity and the API are very reproducible with a relative standard deviation of about 0.1%, even after multiple passes through the two columns and over an analysis time as large as about 12 hours.

The collection subunit 106 includes a fraction collector or collection vial 132 that is in fluid communication with the first and second chromatographic columns 124, 126. The fraction collector 132 can be used to collect the impurity after it has been fully separated from the API and as it elutes from the columns 124, 126. A collection (or second) valve 134 is positioned before the fraction collector 132. The collection valve 134 can be, for example, a rotary valve. The collection valve 134 can be a spool valve, a linear valve, or a rotary valve. The valve 134 can be, for example, a rotary shear valve The collection valve 134 can be a four port valve. When the valve 134 is in a first position, the flow from the columns 124, 126 flow to a waste bottle 136. When the valve 134 is in a second position, the flow from the columns 124, 126 flow to the fraction collector 132.

The collection subunit 106 can also include a collection detector 138 positioned prior to the fraction collector 132. The collection detector 138 can be positioned before the valve 134. The detector 138 can be, for example, a UV-Vis diode array detector or a mass spectrometer. Any other type of detector can be used as well. If the chosen detector cannot withstand the system pressure, then a split flow approach can be used to allow the chosen detector to operate within its typical pressure limitations. The information from the detector 138 can be used to determine what is being collected in the fraction collector 132. In addition, the detector 138 can control the purity of the collected fraction of the unknown targeted impurity.

Figure 2:
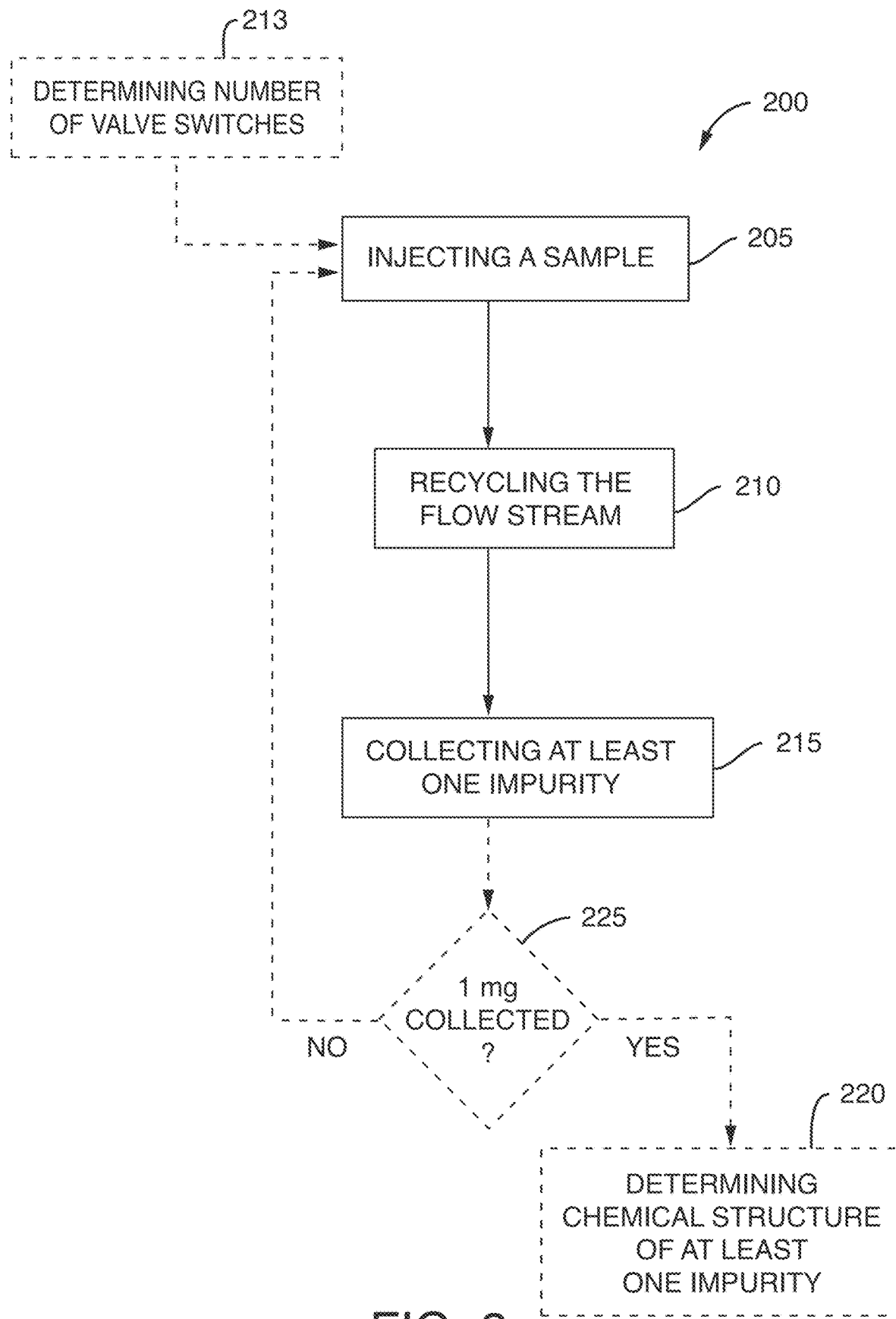
FIG. 2 is a flow chart of a recycling chromatography method, according to an illustrative embodiment of the technology.

FIG. 2 is a flow chart of a recycling chromatography method 200. The method 200 includes injecting a sample 205 into a mobile phase flow stream of a chromatography system to create a combined flow stream. The sample includes an active pharmaceutical ingredient (API) and at least one impurity. For example, the sample can include one, two, three, four, five, six, or more impurities. The impurity can be a trace impurity. A trace impurity is an unintended small amount of a substance other than the API, that is often difficult to detect and/or measure. The trace impurity can have, for example, a concentration of less than about 0.01 g/L in a concentrated solution of APR (about 10 g/L). The selectivity factor of the active pharmaceutical ingredient and the impurity is less than about 1.2.

The sample is injected into a chromatography system. The chromatography system can be, for example, the chromatography system of FIG. 1 including any embodiment described herein.

The combined flow stream is recycled 210 from a first chromatographic column to a second chromatographic column (e.g., chromatographic columns 124, 126 of FIG. 1) and from the second chromatographic column to the first chromatographic column by switching a valve (e.g., valve 128 of FIG. 1) until a baseline resolution is achieved to separate at least one impurity from an API. In some embodiments, the number of valve switches needed to reach a baseline resolution is predetermined 213 before the sample is injected into the chromatography system. The number of valve switches needed to reach a baseline resolution can be predetermined by a prior calibration experiment or by calculations known to those of skill in the art. These known switching times can then be programmed into a timetable of a column manager, which can be used to switch the valves at the requisite times. The impurity band is then collected at the end of the last cycle. In addition, the known start and end times of the fraction manager can be entered into a timetable of the fraction manager.

In some embodiments, step 210 includes a test loop to determine whether or not a predetermined purity level has been reached. For example, the test loop can determine whether a 90% purity level of the unknown impurity has been reached. If yes, then the system moves on to step 215. If not, then the flow stream is recycled until the predetermined purity has been achieved.

This mimics an infinitely long column that can still be operated at optimum velocity and low pressures. The entire chromatographic band of the targeted impurity can be recycled as many times as necessary between the twin columns until it is fully separated from that of the main drug and of other non-targeted impurities.

The at least one impurity is then collected 215 in a fraction collector (e.g., fraction collector 132 of FIG. 1). In some embodiments, a certain amount of the impurity is required for further testing. For example, 1 mg of impurity is required for determining the chemical structure 220 of the impurity via nuclear magnetic resonance (NMR). Therefore, after the at least one impurity is collected 215, a decision is made as to whether the requisite amount of the impurity has been collected 225. If the requisite amount of impurity has been collected, for example 1 mg for NMR analysis, then the chemical structure of the at least one impurity can be determined 220. If the requisite amount of the impurity has not been collected, for example, less than 1 mg of impurity has been collected, then the injection step (205), recycling step (210) and collecting step (215) are repeated as many times as necessary to collect the requisite amount of impurity.

The information from the NMR can be used in conjunction with the other detectors in the chromatography system, for example, detector 138 of FIG. 1, to determine the structure of the impurity.

The impurity can be collected in various purities. For example, the collected impurity can be 90%, 95% or 99% pure. In some embodiments the collected impurity is 91%, 92%, 93%, 94%, 96%, 97%, or 98% pure. In one embodiment, for example when chemical structure elucidation is required using NMR, the faction collector collects about 1 mg of impurity at a purity level of at least about 90%.

Moreover, in the method described above, about 100% yield if obtained, i.e., about all the injected mass of the impurity is collected. In some embodiments, the yield of the impurity is 95%, 96%, 97%, 98% or 99%.

The method can be performed under isocratic conditions, where the composition of the mobile phase eluent is kept constant and uniform. The method is particularly useful when the impurity and the API nearly co-elute, but can be used for any impurity/API elution profile.

The systems and methods described herein combine ultra-high resolution performance (for the separation of an unknown trace impurity that is nearly co-eluting with the main API) and semi-preparative capabilities (for the preparation of a predetermined quantity (e.g., 1 mg) of a trace impurity). Additionally, the systems and methods removes any undesirable problems encountered in preparative chromatography, including (1) the mismatch between the elution strength of the sample diluent and that of the eluent, which causes severe band distortion and loss of band resolution, and (2) the mismatch between the viscosity of the sample diluents and that of the eluent, which causes distorted and irreproducible band shapes leading to weak process robustness and resolution loss.

The systems and method described herein can be used for the challenging separation and preparation of small amount (about 1 mg) of low-abundant isotopes, enantiomers, isomers, polymers, and aggregates of monoclonal antibodies. The systems and methods can be applied at different preparative scales (from about 2.1 mm to 3 cm inner diameter columns) and for any chromatography retention modes (for example, reverse phase liquid chromatography, normal phase liquid chromatography, hydrophilic interaction liquid chromatography, or size exclusion chromatography) and for any physical state of the mobile phase (for example, gas, liquid, or supercritical fluid (e.g., carbon dioxide)).

The technology described herein can be used to clean a sample from all its early (eluting before the sample) and late (eluting after the sample) impurities.

Example 1 (Theoretical)

In this example the production rate of the semi-preparative TCRSP is optimized from a theoretical viewpoint. In a first step, the resolution power of the TCRSP used to separate the targeted impurity from the API is optimized from the construction of speed-resolution plots at the imposed maximum pressure drop along the two twin columns ($\Delta P$=4000 psi), each of them having a fixed length L–15 cm. The best commercially available particle diameter $d_{p,opt}$ is then determined for the purification process. In a second step, imposing a yield and a purity level of at least 99.7% and 99.0% respectively, the production rate is maximized by finding the largest injection volume ($V_{p,opt}(n_{opt})$) at the optimum cycle number ($n_{opt}$) using two 4.6 mm inner diameter (i.d.)×15 cm length columns. It is assumed in the calculations that the adsorption isotherms of both the impurity and the API are linear.

Ultra-High Resolution Chromatography: Performance Optimization of the Recycling System The TCRSP is based on recycling multiple times a targeted separation zone (the entire band of the trace impurity and a fraction API band) from one to the other twin column. Based on the observed pressure drop, $\Delta P$, along the two twin columns and the fixed length, L, of each column, the optimum particle sizes, $d_{p,opt}$, that maximize either resolution power or speed-resolution performance can be unambiguously determined. All the necessary details for the selection of $d_{p,opt}$ are given in F. Gritti, S. Cormier, *Performance Optimization of Ultra High-Resolution Recycling Liquid Chromatography*, J. Chromatogr. A 1532 (2018) 74-88. The main results are summarized in this example.

The method is based on the construction of speed-resolution plots for the TCRSP. Under ideal conditions (no loss in column efficiency upon accumulation of cycles), the resolution factor, $R_s(n)$, expected after n cycles is shown in Equation 1.

$$R_s(n) = \frac{1}{4}\sqrt{\frac{nL}{H}}(\alpha-1)\frac{k'_A}{1+\bar{k}'} \quad (1)$$

where $$\alpha = \frac{k'_B}{k'_A} = 1.166$$

is the observed selectivity factor, $$\bar{k}' = \frac{k'_A + k'_B}{2} = 0.78$$

is the average retention factor of the two compounds to be separated, and $k'_A$=0.72 is the retention factor of the least retained compound A. In the present Example, the subscripts A and B refer to the impurity and to the API, respectively. The plate height H in Equation 1 is typically that of small molecules (diffusion coefficient $D_m$~1.5×10$^{-5}$ cm$^2$/s) which are weakly retained in RPLC. Based on the classical Knox plate height model, the reduced plate height $h=H/d_p$ is written in Equation 2.

$$h = \frac{H}{d_p} = \frac{B}{v} + Av^{1/3} + Cv \quad (2)$$

where B=3.0, A=1.0 and C=0.01 in agreement with the observed efficiency of the 4.6 mm×150 mm column packed with 3.5 μm Sunfire-$C_{18}$ fully porous particles (100 Å average pore size) and used in this Example (N=18000 for both the API and impurity at a flow rate of 0.7 mL/min, T=30° C., and acetonitrile/water mobile phase 65/35 v/v). v is the reduced interstitial linear velocity (Equation 3)

$$v = \frac{ud_p}{D_m} \quad (3)$$

In Equation 4, u is the interstitial linear velocity $$u = \frac{F_v}{\epsilon_e \pi r_c^2} \quad (4)$$

where $F_v$=0.7 mL/min is the applied flow rate, $\epsilon_e$=0.38 is the external porosity of the chromatographic bed, and $r_c$=0.23 cm is the inner radius of the column.

The relationship between u, $d_p$, ΔP, and L in the TCRSP is given by the Kozeny-Carman relationship shown in Equation 5

$$u = \frac{\epsilon_e^2 d_p^2}{K_c(1-\epsilon_e)^2} \frac{\Delta P}{2L} \quad (5)$$

where $K_c$=148 is the measured Kozeny-Carman constant from the plot of the pressure drop corrected for extra-column pressure as a function of linear velocity.

The hold-up time per unit of resolution factor, $t_0/R_s$ is given by Equation 6

$$\frac{t_0}{R_s}(n) = \frac{n}{R_s(n)} \frac{\epsilon_t}{\epsilon_e} \frac{L}{u} \quad (6)$$

where $\epsilon_t$=0.58 is the total porosity of the column estimated from the retention time of thiourea in the mobile phase.

The speed-resolution plot of $t_0/R_s(n)$ versus $R_s(n)$ is then built up to a maximum number, $n_{max}$, of cycles in the TCRSP under linear conditions. Beyond that maximum number of cycles, the spatial width of the separation zone would exceed one column length. Assuming symmetrical Gaussian peaks and a 2mσ baseline peak width (m=3 and σ is the peak standard deviation), $n_{max}$ is given by Equation 7.

$$n_{max} = \text{Int}\left(\frac{-\left[f(2f-1) + m^2(f-1)\frac{H}{L}\right] - \frac{m^2\sqrt{\Delta}}{2}}{(2f-1)^2}\right) \quad (7)$$

where Δ is given by Equation 8.

$$\Delta = 4\left[\frac{f(2f-1)}{m^2} + (f-1)\frac{H}{L}\right]^2 - 4\frac{(2f-1)^2}{m^2}\left[\frac{f^2}{m^2} + (f-1)\frac{H}{L}\right] \quad (8)$$

where the coefficient f<0.5 is the ratio of the migration velocity of the most retained compound B to the sum of the migration velocities of the two compounds.

Semi-Preparative Chromatography: Optimization of the Production Rate

The starting API stock solution from which the trace impurity has to be extracted (yield >99.7% for maximum recover and purity >90.0% for unambiguous structural identification by liquid state NMR) by the discontinuous TCRSP is a concentrated API solution ($C_{API}$=10 g/L) containing several impurities eluting before and after the API peak. In this Example, the targeted impurity elutes immediately before the API (selectivity factor α=1.166). The goal is to collect the largest amount of this co-eluting impurity in the shortest possible time (maximum production rate). The yield is set about 99.7% because the injected impurity is present in trace amount in the API stock solution and 1 mg material is required for NMR analysis. Additionally, the purity has to be better than 90.0% for unambiguous structural elucidation by NMR. In the calculations, it was set at 99.0%. The unknown impurity to that of the API was found for a wavelength λ=254 nm. This ratio is 1/67 for the stock solution. At a very first approximation, assuming that the extinction coefficients of the impurity and API are comparable at maximum absorbance (at λ=260.7 nm for the impurity and λ=279.6 nm for the API), the concentration of the impurity in the stock solution was estimated in the calculations at 0.0175 g/L.

Given the applied pressure drop ΔP=4000 psi along the two twin columns connected in series, their length L=15 cm, their inner radius $r_c$=0.23 cm, and the pre-determined optimum particle diameter $d_{p,opt}$, two last experimental parameters have yet to be selected in the semi-preparative process. There are 1) the optimum number of cycles $n_{opt}$ in the TCRSP and 2) the largest allowable injection volume $V_{p,opt}$ ($n_{opt}$) that will maximize the production rate given the constraints on yield and purity. The maximum sample volume $V_{p,max}(n)$ that can be injected and collected for a yield larger than 99.7% after n cycles can be predicted from the column hold-up volume $V_0$, the retention factor, $k'_A$, of the impurity and the column efficiency N. The result is given by Equation 9.

$$V_{p,max}(n) = V_0(1 + k'_A)\left[1 - 6\sqrt{\frac{n}{N}}\right] \quad (9)$$

where $V_0$=1.43 mL is the hold-up volume of each twin column, $k'_A$=0.72, and N=18000.

In the next subsection, it is assumed that the elution strength of the sample diluent matches exactly that of the mobile phase. In the second subsection, the mismatch between the elution strengths of the sample diluent (strong) and that of the eluent (weak) is taken into account in terms of band deformation (band fronting). The mismatch in elution strength causes serious band deformation as the front part of both the impurity and API bands extends towards lower elution times as the injection volume is increased.

Ideal Match Between the Elution Strengths of the Sample Diluent and Eluent

Equation 10 shows $t_p$ which is the variable injection time of stock solution.

$$t_p = \frac{V_p}{F_v} \quad (10)$$

Under linear conditions, the concentration profiles of the impurity is given for any number of cycle n by the error function shown in Equation 11.

$$c_A(n, t) = \frac{C_A}{2\sqrt{2\pi}\,\sigma_A} \int_{-\infty}^{t} \left( \exp\left[-\frac{(t'-nt_A)^2}{2n\sigma_A^2}\right] - \exp\left[-\frac{(t'-nt_A-t_p)^2}{2n\sigma_A^2}\right] \right) dt' \quad (11)$$

where t' is a dummy variable, $t_A$ is the retention time of the impurity on a single column, and $\sigma_A$ is the temporal standard deviation of the concentration distribution of the impurity when $t_p$ tends towards zero.

Similarly, the concentration profiles of the API is given by Equation 12.

$$c_B(n, t) = \frac{C_B}{2\sqrt{2\pi}\,\sigma_B} \int_{-\infty}^{t} \left( \exp\left[-\frac{(t'-nt_B)^2}{2n\sigma_B^2}\right] - \exp\left[-\frac{(t'-nt_B-t_p)^2}{2n\sigma_B^2}\right] \right) dt' \quad (12)$$

where $t_{API}$ is the retention time of the API on a single column and $\sigma_B$ is the corresponding temporal standard deviation of the concentration distribution of the API when when $t_p$ tends towards zero.

Collecting the impurity between $t_{Start}=nt_A-3\sqrt{n}\sigma_A$ and $t_{End}=nt_A+t_p+3\sqrt{n}\sigma_A$ ensures the yield to be larger than 99.7%. The purity P is defined as the collected mass of impurity to the total mass collected. It is given by Equation 13.

$$P = \frac{\int_{t_{Start}}^{t_{End}} c_A(t)\,dt}{\int_{t_{Start}}^{t_{End}} [c_A(t) + c_B(t)]\,dt} \quad (13)$$

For any fixed cycle number n, the largest volume, $V_{p,max}(n)$, of stock solution that can be injected in unambiguously determined so that the objective P>99.0% is met.

The production rate, Pr(n), is defined as the mass of impurity collected per unit time when n cycles are applied. It is then written as shown in Equation 14.

$$Pr(n) = \frac{F_v \int_{t_{Start}}^{t_{End}} c_A(t)\,dt}{t_{Delay} + \frac{V_{p,max}(n)}{F_{Draw}} + \frac{nV_0(1+k'_A) + V_{p,max}(n)}{F_u} + 3\sqrt{n}\,\sigma_A} \quad (14)$$

where $t_{Delay}=10$ s is the delay time between the end of a run and the start of the sample drawing event, $F_{Draw}=100$ μL/min is the flow rate at which the sample volume is delivered into the injection loop. $n_{opt}$ is defined at the maximum of Pr(n).

Mismatch Between the Elution Strengths of the Sample Diluent and Eluent

Figure 6:
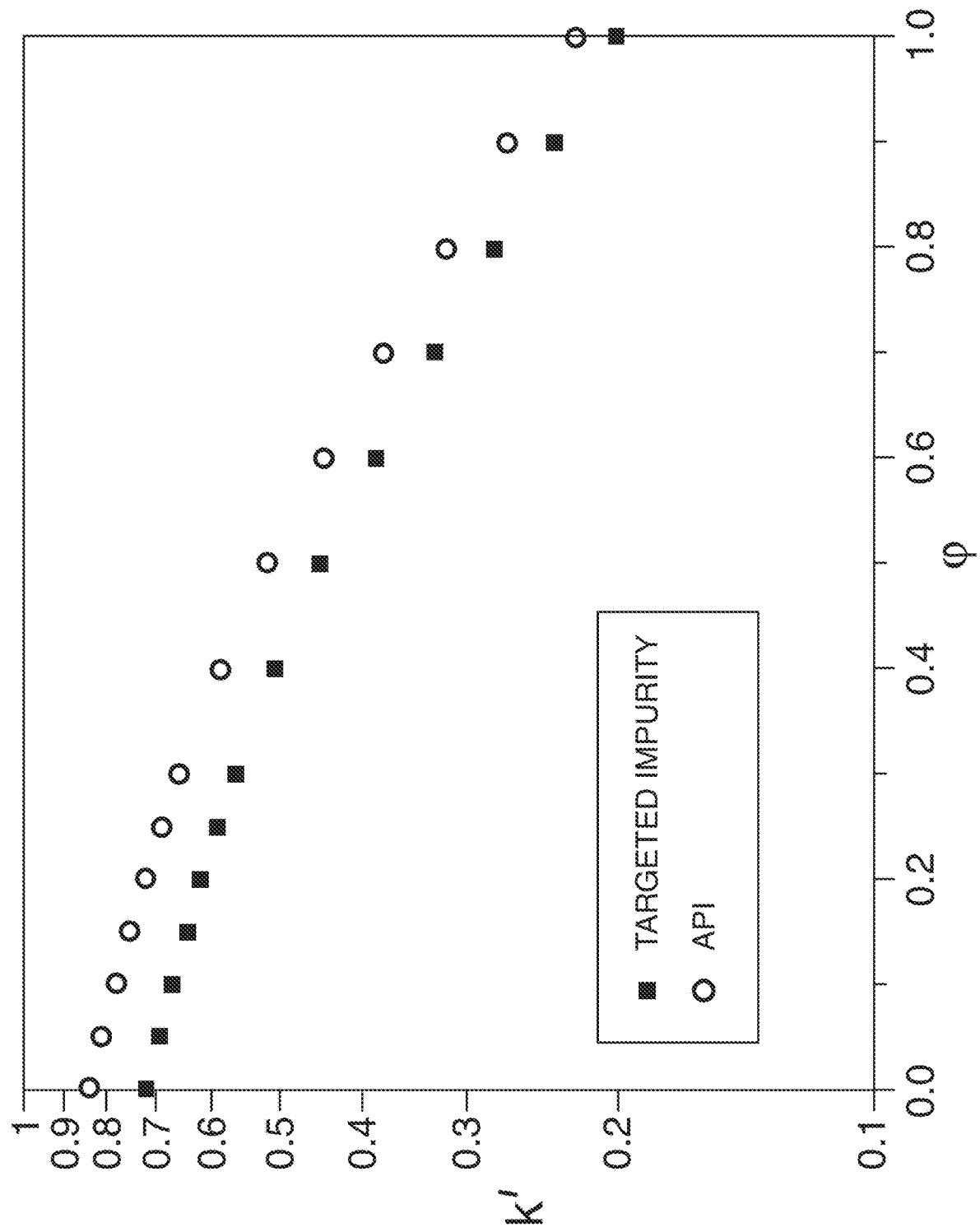
FIG. 6 is a graph of the variation of the retention factor, k', of both the targeted impurity (squares) and the API (circles) as a function of the volume fraction of the sample diluent in the mobile phase, according to an illustrative embodiment of the technology.

In this subsection, the retention factors of the impurity and API are dependent on the volume fraction, φ, of the sample diluent injection (acetonitrile/methanol, 50/50, v/v) into the eluent (acetonitrile/water 65/35, v/v). From experimental data, it is found that the following empirical relationship (Equations 15 and 16) is the most accurate (see FIG. 6)

$$k'_A(\varphi) = k'_A \exp(-S_A\varphi - T_A\varphi^2) \quad (15)$$

where $S_A=0.6359$ and $T_A=0.6599$ are two positive and empirical parameters associated with the impurity.

$$k'_B(\varphi) = k'_B \exp(-S_B\varphi - T_B\varphi^2) \quad (16)$$

where $S_B=0.6276$ and $T_B=0.7063$ are two positive and empirical parameters associated with the API. In FIG. 6, note the reduction by about a factor of 4 from pure mobile phase (k'~0.8, weak) to pure diluent (k'~0.2, stronger).

The distorted concentration band profiles of the impurity and API are then calculated from the equilibrium dispersive (ED) model of chromatography by considering three different components in the eluent: 1) the impurity (compound A); 2) the API (compound B); and 3) the diluent (volume fraction φ). Based on the experimental observations, the adsorption isotherms of both the impurity and API are assumed to be linear. See Equations 17 and 18.

$$q_A = \frac{\epsilon_t k'_A(\varphi)}{1-\epsilon_t} C_A \quad (17)$$

$$q_B = \frac{\epsilon_t k'_B(\varphi)}{1-\epsilon_t} C_B \quad (18)$$

and the diluent mixture is considered unretained.

The apparent axial dispersion coefficient, $D_a$ in the ED model is fixed from the measured efficiency N=18000 of the 15 cm long column shown in Equation 19.

$$D_a = \frac{Lu_0}{2N} \quad (20)$$

The new optimum number of cycles ($n_{opt}$) and the injection volume ($V_{p,opt}(n_{opt})$) are finally determined by maximizing the calculated production rate (Equation 14) for yield and purity levels equal to 99.7% and 99.0%, respectively.

Mismatch Between the Elution Strengths and Viscosities of the Sample Diluent and Eluent Besides the difference in the elution strengths of the sample diluent and eluent, their viscosities are also different. Viscous fingering can then affect the band shapes due to the instability of the boundary between the injected sample diluent (low viscosity 0.34 cP) and the eluent (high viscosity 0.59 cP) along a porous media. The front of the weakly retained compounds (k'<1) band are then randomly deformed as the sample diluent forms fingers into the mobile phase. This phenomenon is difficult to predict accurately and it will be simply observed in the experimental work.

Example 2 (Experimental)

Recycling Experiments

A high performance liquid chromatography system was built to prepare about 1 mg of drug impurities (purity >90%) from structure elucidation by liquid state NMR. The system is based on alternate pumping (or twin column) recycling liquid chromatography. It is coupled to a fraction collector and is designed to cope with the following severe experimental constraints: the impurity is barely separated from the API (poor resolution), the drug diluent is strong relative to the eluent (causing bands to front), viscous fingering occurs (causing random band deformation), the impurity-to-drug ratio is extremely small (<1/100), and the yield and purity levels required are larger than 99% and 90% respectively. The particle diameter used to pack the twin columns, the number of cycles, and the sample injection volume are all optimized to maximize the production rate of the twin column recycling separation process (TCRLP).

The experiments were carried out on a modified UHPLC® instrument (commercially available from Waters Technologies Corporation, Milford, Mass.) implemented with an automated TCRSP system (two column manager) for impurity isolation and an Analytical Fraction Manager for impurity collection. The system includes a semi-preparative (4.6 mm i.d. columns), high resolution, twin column (two 4.6 mm×150 mm 3.5 μm Sunfire-$C_{18}$ column) recycling liquid chromatography system. They include a bindary solvent pump mixture, a flow through needle sample manager equipped with 10 mL vials, a 30 μL loop, and a 100 μL extension loop, a two-column oven compartment with two positions (one for each column), low dispersion 8-port recycling valve, a fraction manager analytical equipped with 10 mL collection vials and a two position (waste and collect) 4-port valve, two low-dispersion (50 nL volume) detection cells and their module box (light source, photodiode, and fiber optics to carry light). All the components are connected via Zenfit perfect connection (face seal) tubing. The whole system is automated by Empower software (commercially available from Waters Technologies Corporation, Milford, Mass.).

Figure 3:
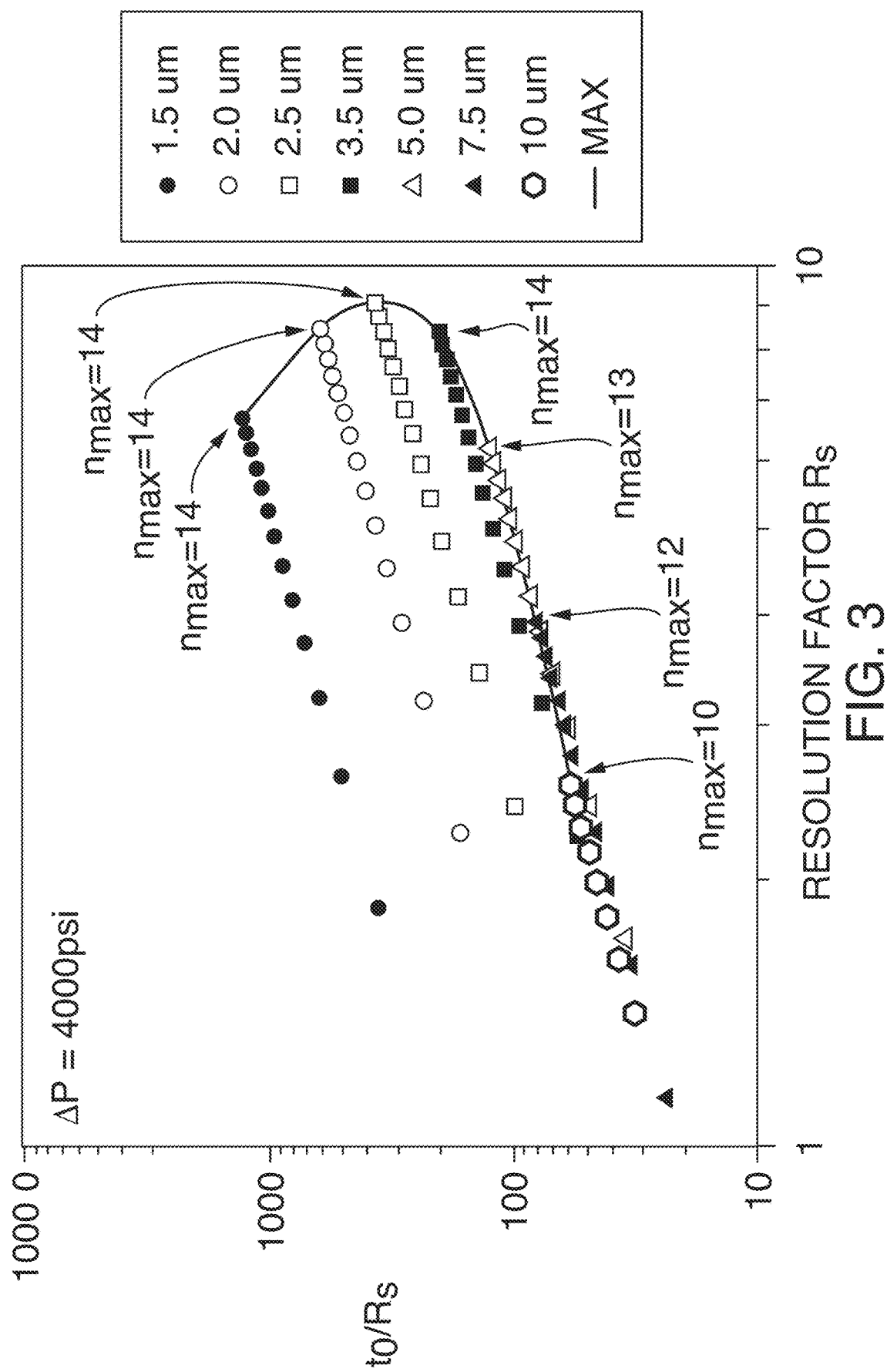
FIG. 3 is a is a graph showing the calculated speed-resolution or kinetic plots of the recycling process at a constant pressure drop of 4000 psi and for two twin columns of length L=15 cm packed with particles of size increasing from 1.5 to 2.0, 2.5, 3.5, 5.0, 7.5, and to 10 μm, according to an illustrative embodiment of the technology.

The sample solution is a stock solution of estradiol (10 g/L) dissolved in a mixture of acetonitrile and methanol (50/50, v/v, strong elution strength). The mobile phase is a mixture of acetonitrile and water (65/35, v/v, weaker elution strength). The flow rate is set at 0.7 mL/min. The oven and eluent temperatures are maintained at 30+/–0.1° C. The pressure drop along the two columns is measured around 4000 psi. the 4.6 mm×150 mm twin columns are packed with 3.5 μm Sunfire-$C_{18}$ particles, which maximize the speed-resolution performance of the TCRLC process at 4000 psi pressure drop (see FIG. 3). FIG. 3 is a is a graph showing the calculated speed-resolution or kinetic plots of the recycling process at a constant pressure drop of 4000 psi and for two twin columns of length L=15 cm packed with particles of size increasing from 1.5 to 2.0, 2.5, 3.5, 5.0, 7.5, and to 10 μm. Each empty circle accounts for a particular number of cycles (or of number of passages through one column length) from 1 to the maximum allowable number of cycles. The x-axis represents the resolution factor for any number, n, of cycles. The y-axis represents the ratio of the hold-up time to the resolution factor. The thick solid black line locates the highest resolution factors expected for the maximum allowable number of cycles. Note a first optimum particle size, which maximizes resolution and is located at the unique intersection between the solid black line and a vertical target (not drawn): this would correspond to a 2.5 μm particle size. Note also a second optimum particle size, which maximizes speed-resolution performance and is located at the unique intersection between the solid black line and a tangent of slow +1 (not drawn) in a log-log scale: this would correspond to about a 5.0 μm particle size. In this example, a 3.5 μm particle size was selected.

The production rate of the TCRLC process was maximized by fixing the cycle number at n=6 and the largest injection volume at 100 μL. The sample content is sent to waste between t=1.0 min and t=2.9 min and between t=4.0 min and t=8.8 min (elimination of early and late non-targeted impurities). The targeted impurity and the nearly co-eluting impurities and API are transferred for the first time between columns from t=2.9 min to t=4.0 min. This entire zone is transferred another four times between the twin columns. The isolated impurity is finally collected after six cycles between t=20.3 min. and t=21.3 min. This very same method was repeated 600 times over a non-stop period of 1.5 weeks to collect the entire mass of the targeted impurity present in the 60 mL stock solution of estradiol.

Gradient LC-UV-MS Experiments

The chromatographic separation was achieved on an ACQUITY® CSH $C_{18}$ column (2.1 mm×100 mm, 1.7 μm) (commercially available from Waters Technologies Corporation, Milford, Mass.). The vHPLC system was the Agilent 1290 (Piscataway, N.J.). Column temperature was controlled at 40° C. The mobile phase was composed of solvent A (0.1% formic acid in water) and solvent B (acetonitrile). The vHPLC pump gradient was as follows: initial conditions were 5/95 solvent B/solvent A (v/v) for 1.0 min. followed by a linear gradient to 95/5 solvent B/solvent A in 6.0 min. returning to initial conditions in 0.1 min. with column re-equilibrium for 1.9 min. The flow rate was set at 0.4 mL/min. The sample was analyzed with a Thermo Orbitrap Fusion Lumos Mass Spectrometer (Grand Island, N.Y.). This mass spectrometer was equipped with a Heated Electrospray Ionization Probe (HESI) to enhance assay sensitivity. Analytes were detected in the positive ion mode under a full mass scan range from 150 to 1000 daltons with a resolving power of 60,000. The source temperature was set to 350° C., and the ion spray voltage was 3500 V. The Vaporizer temperature was set at 100° C. with a sheath gas flow at 20 L/min, auxiliary gas at 15 L/min and a sweep gas at 2 L/min.

Results and Discussion

Volume Overload without Recycling (n=1)

Figure 4:
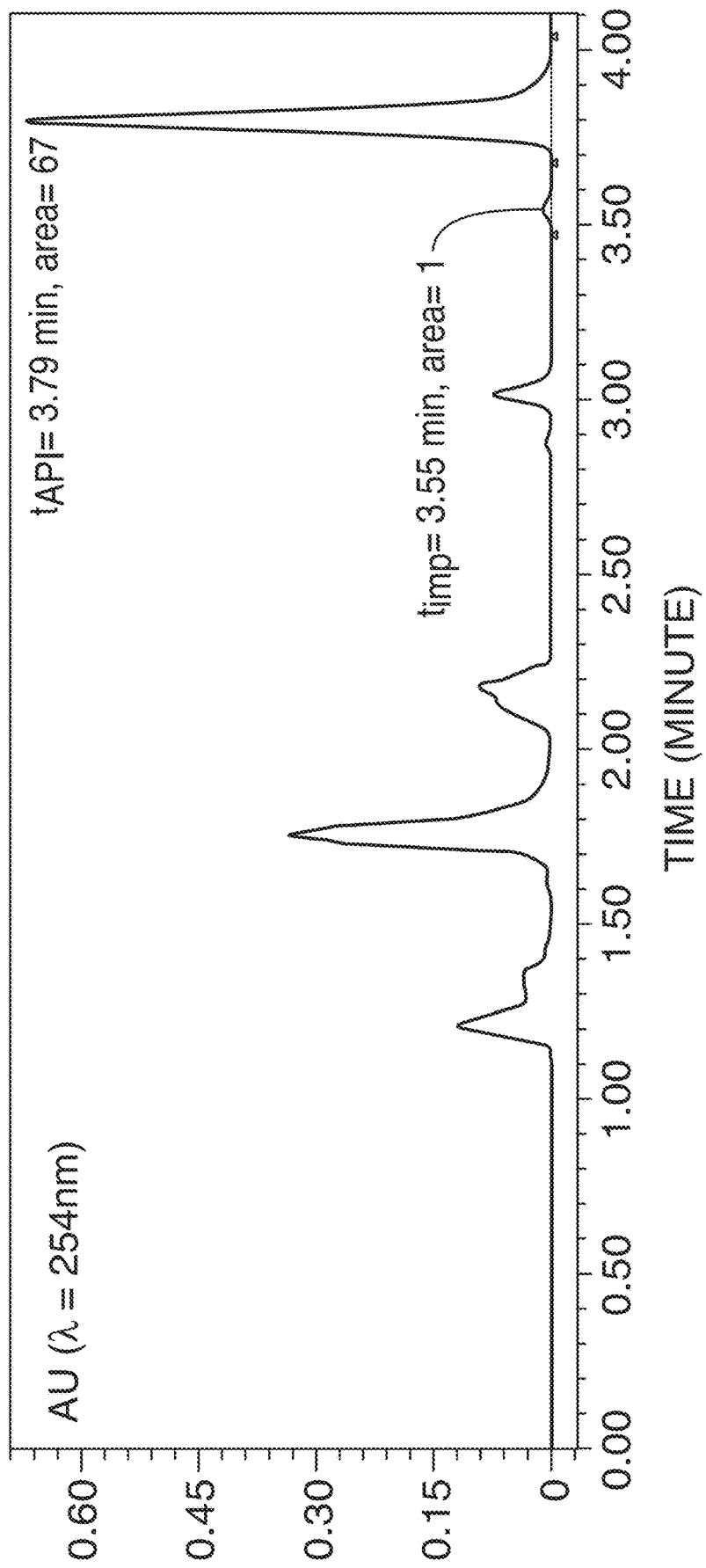
FIG. 4 is a chromatogram recorded after injection of 6 μL of API stock solution after just one cycle, according to an illustrative embodiment of the technology.
Figure 5:
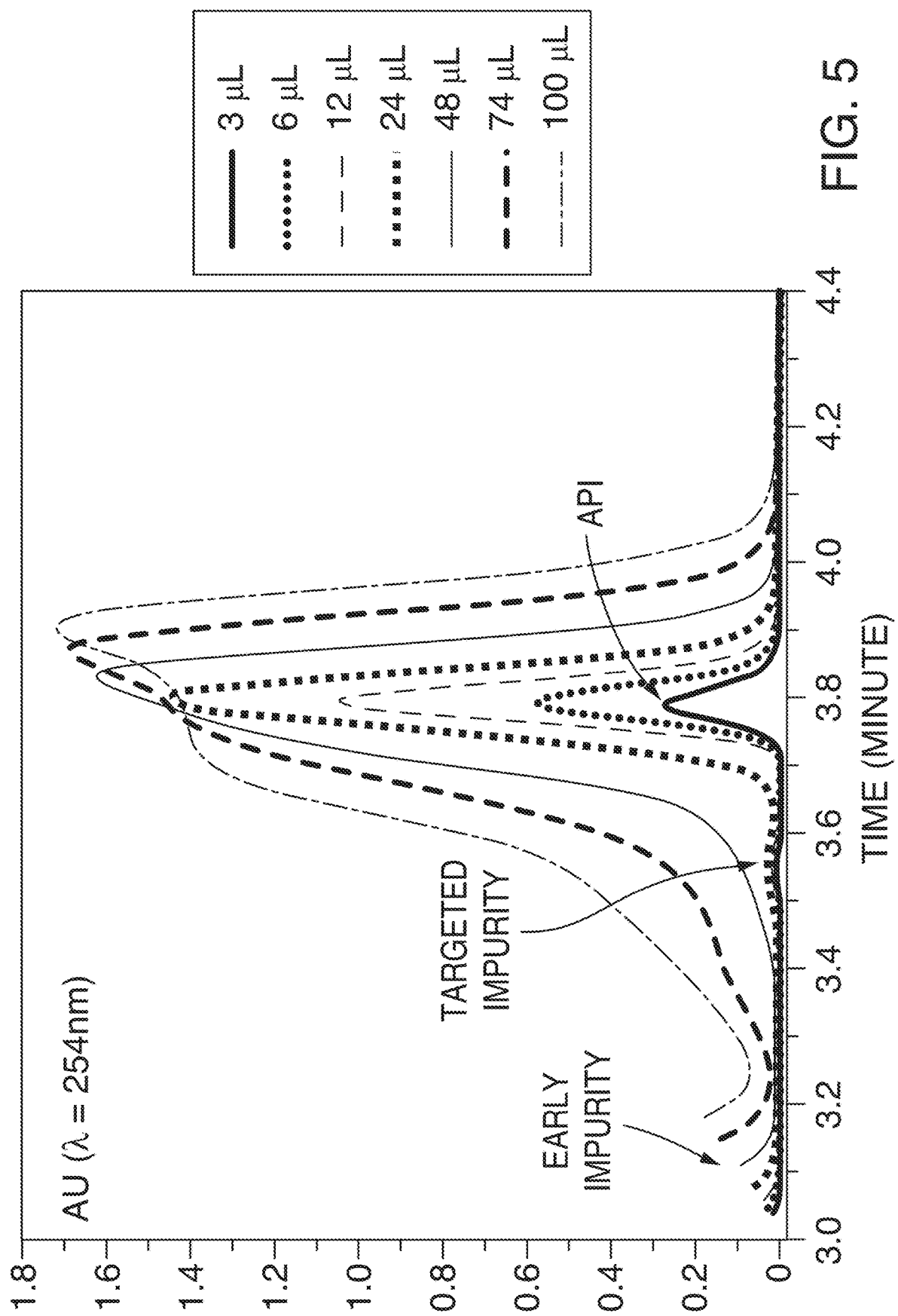
FIG. 5 is a chromatogram that is the same as FIG. 4 except the injection volume of the API stock solution was increased from 3 to 6, 12, 24, 48, 74, and 100 μL, according to an illustrative embodiment of the technology.

FIG. 4 shows the analytical chromatogram (6 μL injection) of the stock solution containing the active pharmaceutical ingredient (API) estradiol (10 g/L) and many unknown impurities. The UV wavelength is set at λ=254 nm because it maximizes the targeted impurity-to-estradiol signal ratio (1 to 67). The targeted impurity elutes at t=3.55 min. while the API estradiol is detected at 3.79 min. (hold-up time $t_0$=2.04 min.). The selectivity factor is then α=1.16. Several non-targeted impurities are detected before and after (not shown) the elution of the targeted impurity and are all eliminated to waste during the TCRLC process. FIG. 5 shows the same chromatogram as in FIG. 3, except the injected sample volume increases from 3 to 6, 12, 24, 48, 74 and to 100 μL. FIG. 5 illustrates the serious separation problem faced by the analyst: it is impossible to get a decent production rate of the targeted impurity with a single column batch process because its band is getting more and more buried under the API band, which dramatically fronts and gets distorted due to sample diluent and viscous fingering effects. The retention factor of the impurity and estradiol are both reduced by a factor of about 4 when the mobile phase is replaced with the sample diluent.

Theoretical Recycling and Optimization of the Production Rate (n=$n_{opt}$)

Figure 7:
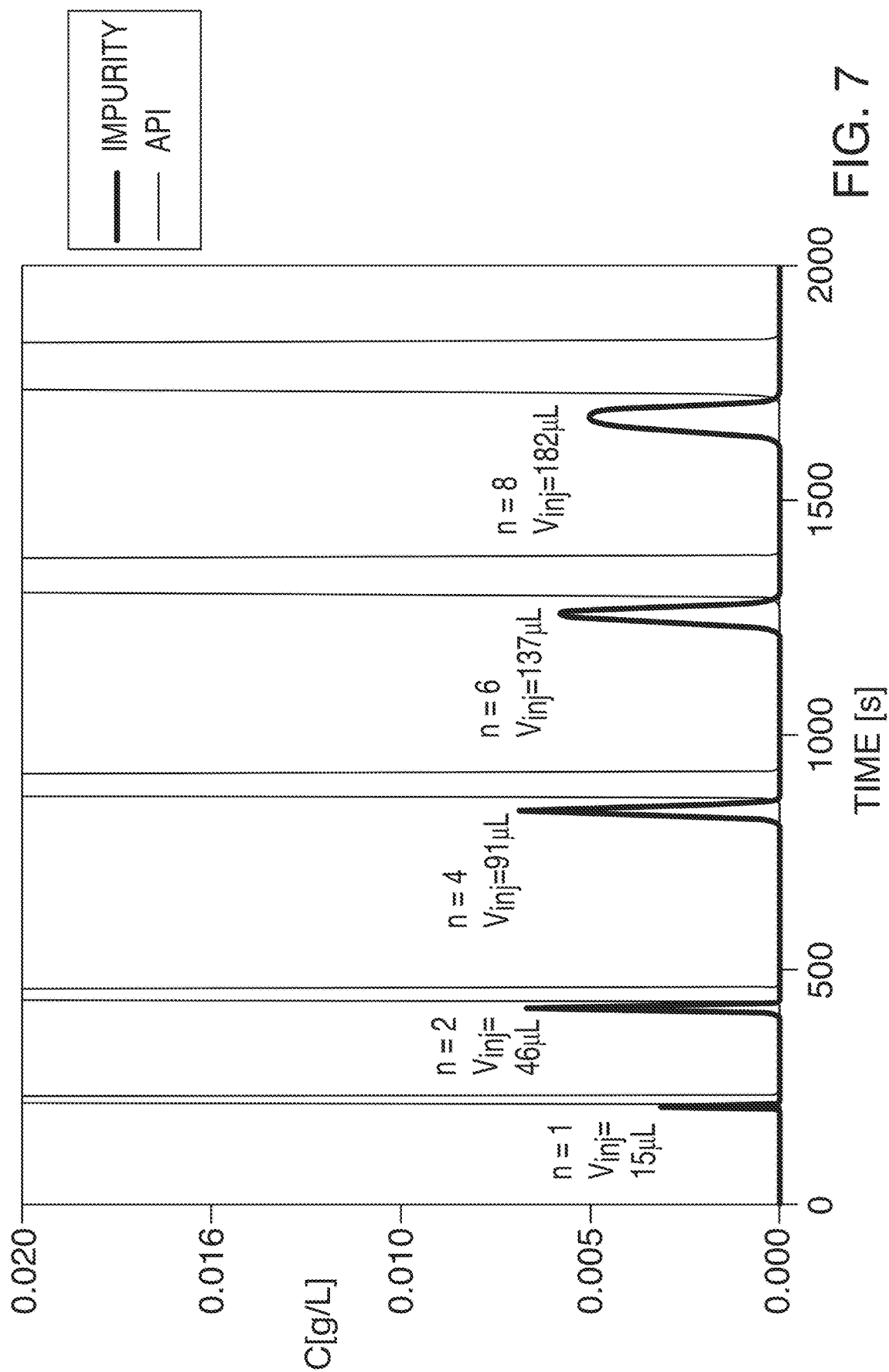
FIG. 7 is a chromatogram of the calculated concentration profiles of the targeted impurity (low concentration) and API (high concentration) when the elution strength of the sample diluent is much stronger than that of the eluent, according to an illustrative embodiment of the technology.
Figure 8:
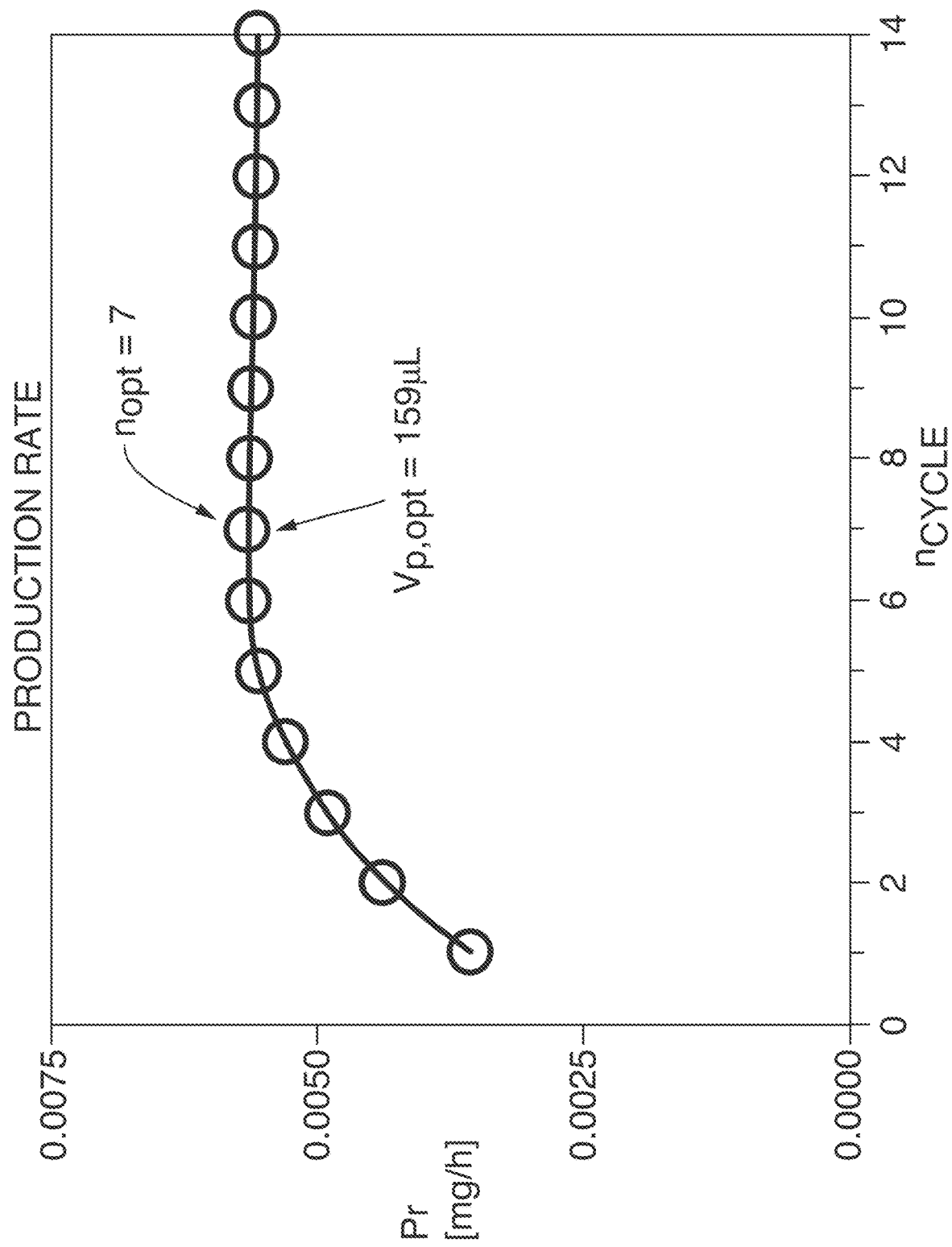
FIG. 8 is a graph showing prediction of the largest production rate of the targeted impurity (99.7% yield and 99.0% purity) as a function of the number of cycles when the elution strength of the sample diluent is much stronger than that of the eluent, according to an illustrative embodiment of the technology.

The question is then to know whether small (and many runs) or large (any less runs) sample volumes should be injected in order to maximize the production rate of the TCRLC process. To answer that question, the calculations of the concentration profiles of the targeted impurity and the estradiol were performed for a series of cycle numbers from 1 to 14 (the maximum allowable number of cycles shown in FIG. 3 for 3.5 μm particles). For each cycle number, the injected volume is maximized so that yield and purity levels are at least 99.7% and 99.0%, respectively. It is important to recall that the calculations are taking into consideration the impact of the strong sample diluent on the retention on the targeted impurity and API. Accordingly, the calculated bands are close to those observed. The results are shown in FIG. 7 for an impurity concentration of 0.0175 g/L versus 10 g/L for the estradiol concentration. The calculations reveal that the band shape are fronting when the injected sample volumes become larger than about 50 μL (number of cycles larger than 2). FIG. 8 shows the corresponding variation of the production rate as a function n. It can be seen that the production rate first rapidly increases from about 3 μg/h (n=1) to about 5.5 μg/h (n=6), then plateaus, and finally slightly decreases for cycle numbers larger than 7. In absolute, the largest production rate is expected for n=7 at 5.6 μg/h. The corresponding injection volume is 159 μL. Accordingly, in the next experiments, n=6 cycles for an injection volume of 100 μL will be selected (the sample manager used is equipped with a 100 μL extension loop).

Experimental Recycling

Figure 9:
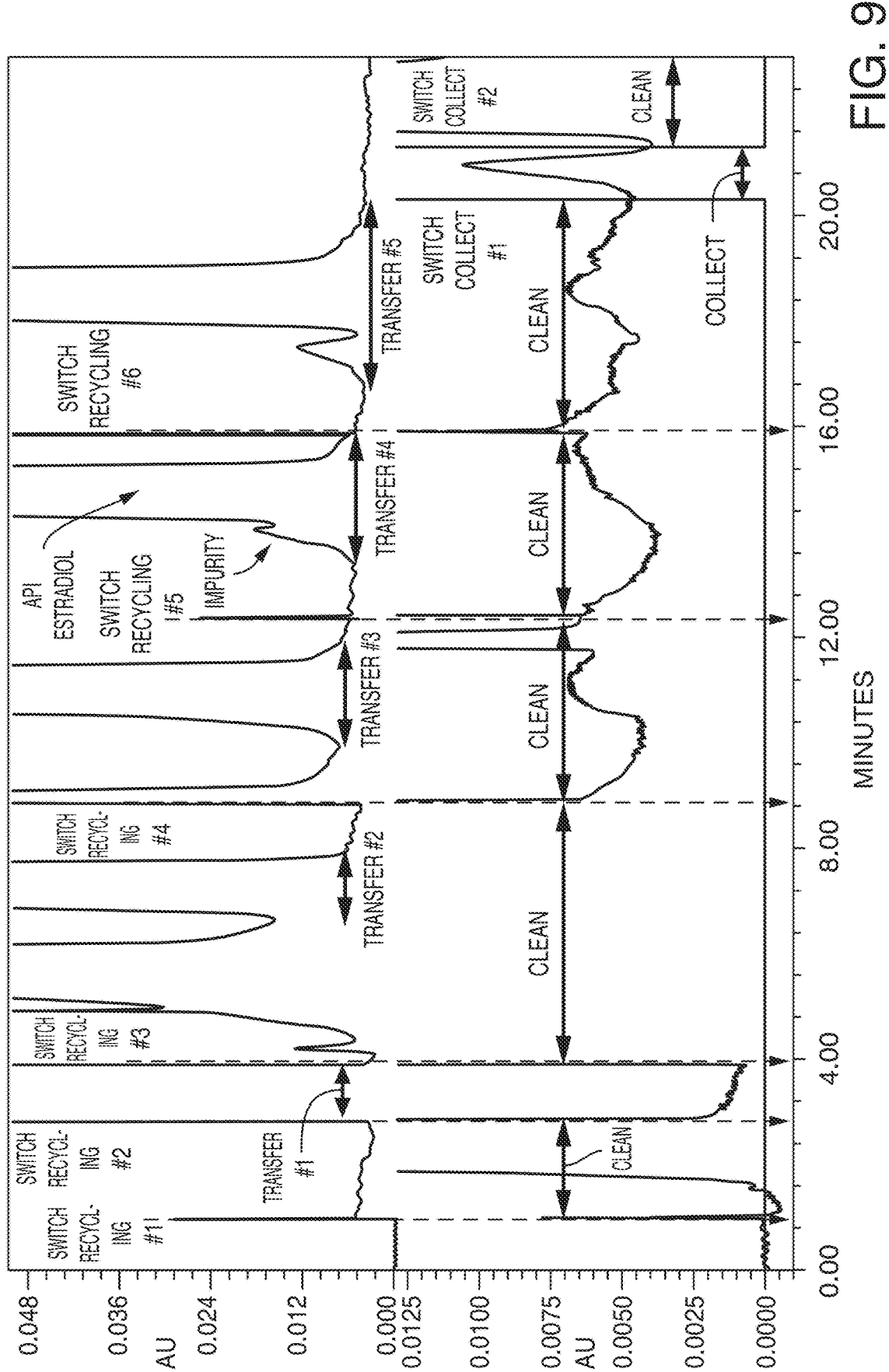
FIG. 9 are experimental chromatograms (number of cycle=6, injection volume of the stock solution=100 μL) of the targeted impurity (low unknown concentration) and API (10 g/L) recorded by the recycling low dispersion detection cell after the first 5 cycles (top chromatogram) and by the collection detection cell after the last and sixth cycle (bottom chromatogram), according to an illustrative embodiment of the technology.

FIG. 9 shows the recycling experiments for n=6 cycles and a 100 μL injection volume (23 min. run). The top and bottom chromatograms were recorded by the low-dispersion cell connected to the recycling valve in between the two twin columns (see the recycle UV cell 130 in FIG. 1 monitoring in real time the progress of the separation between the targeted impurity and the API estradiol) and by the second low-dispersion cell placed between the recycling valve and the collection valve (see the collection UV cell 138 in FIG. 1 monitoring in real time the separation status immediately before waste or reaction collection), respectively. As indicated by the dotted vertical lines at t=2.9 min and t=4.0 min., the targeted impurity is transferred between columns from t=2.9 min to t=4.0 min while the non-targeted impurities are eliminated to waste before and after as can be seen from the bottom chromatogram. The targeted impurity is transferred four more times by actuating the recycling valve at t=8.9 min., 12.4 min., and 15.9 min. From the top chromatogram, it is striking to observe that the impurity is fully buried under the API band until the fourth cycle is completed after which the apex of the impurity band becomes visible. After the fifth cycle, the impurity is almost baseline separated from the API and its band is clearly fronting as predicted by the calculations. After the sixth cycle (bottom chromatogram), the impurity band is baseline separated from the estradiol band (based on absorption signals recorded at the UV wavelength λ=254 nm). It is ready to collected from t=20.3 min. and t=21.3 min. as shown by the solid vertical lines.

Repeatability of the TCRSP, Production Rate, and Purity Levels Achieved

Figure 10:
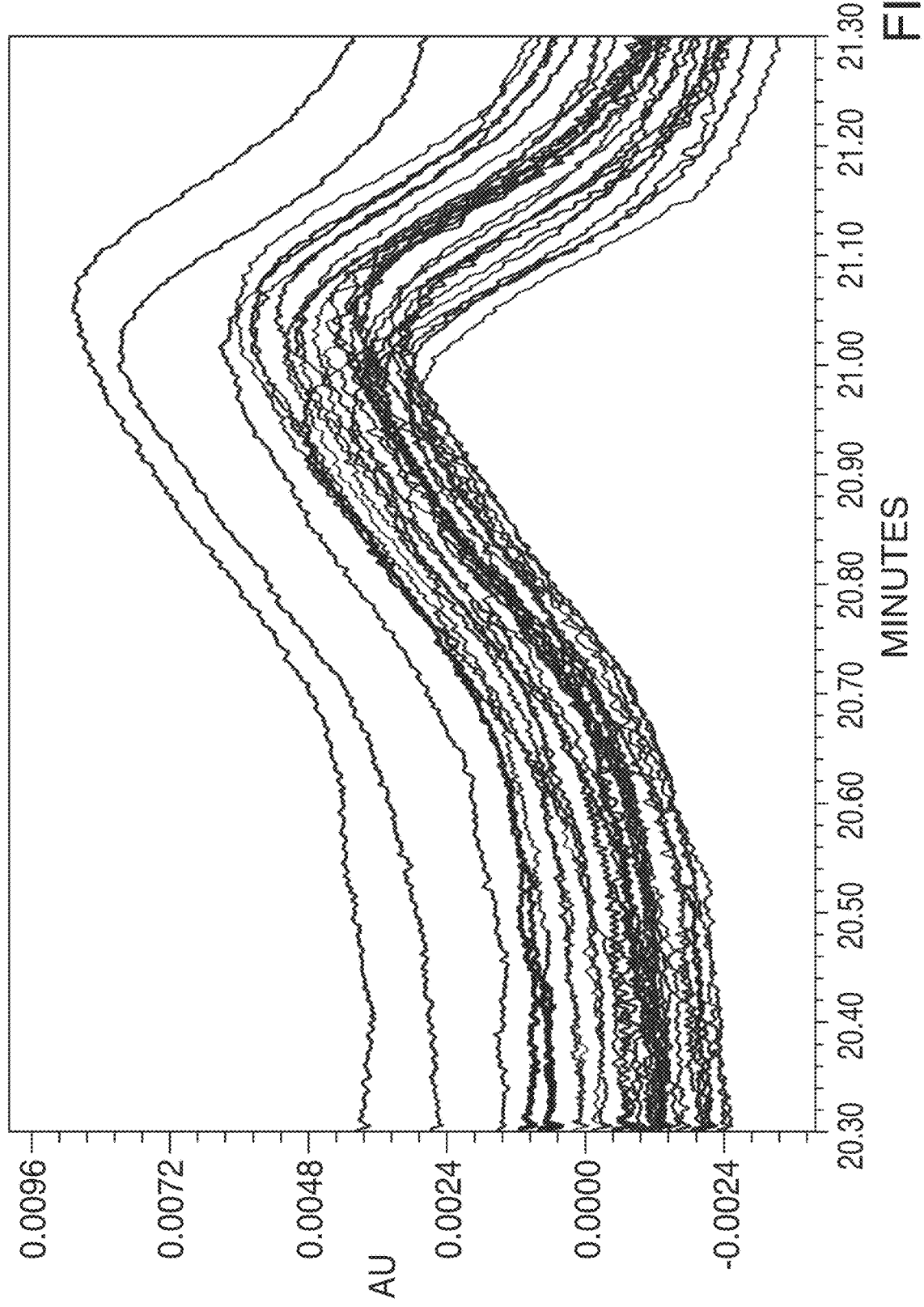
FIG. 10 is a chromatogram showing the repeatability of 30 consecutive experimental chromatograms recorded by the collection detector after the sixth cycle during the 1 min. collection period from t=20.3 min. to t=21.3 min., according to an illustrative embodiment of the technology.

To collect all the targeted impurity present in the 60 mL stock solution of estradiol, 600 recycling runs were repeated sequentially. The repeatability of the recycling run is then critical to achieve excellent purity levels. FIG. 10 shows 30 consecutive collection chromatograms recorded between t=20.3 min. and 21.3 min. The relative standard deviation of the retention times observed at the apex of the collected band of the impurity is as low as 0.1% because the temperature of the twin columns and that of the mobile phase are actively controlled at 30+/−1° C.

Figure 11:
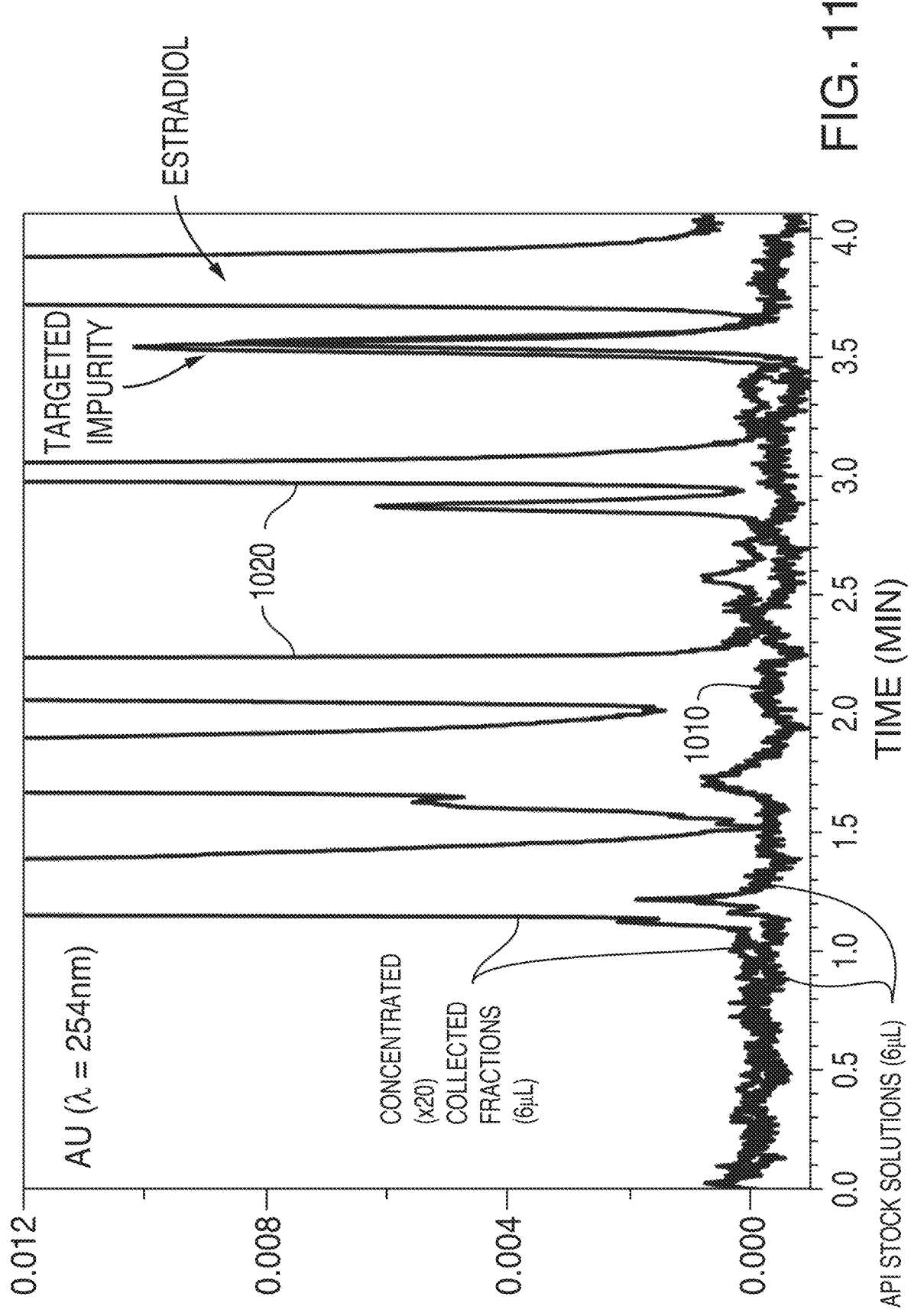
FIG. 11 is a comparison between the original chromatogram recorded for the API stock solution 1020 and that recorded for the concentrated fractions of the unknown impurity 1010, according to an illustrative embodiment of the technology.
Figure 12A:
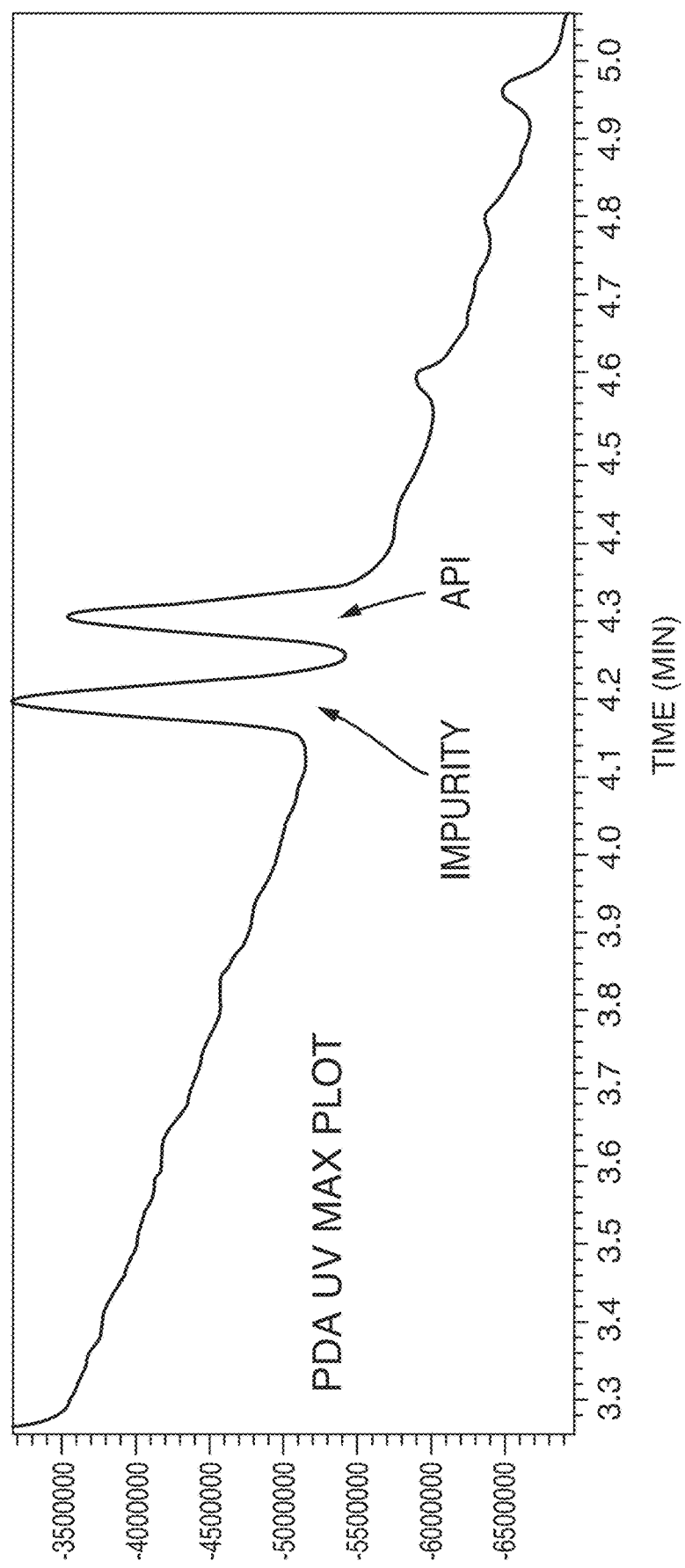
FIG. 12A is a gradient LC-single ion monitoring MS experiments unambiguously revealing the mass for the molecular ion of the unknown targeted impurity, according to an illustrative embodiment of the technology.
Figure 12B:
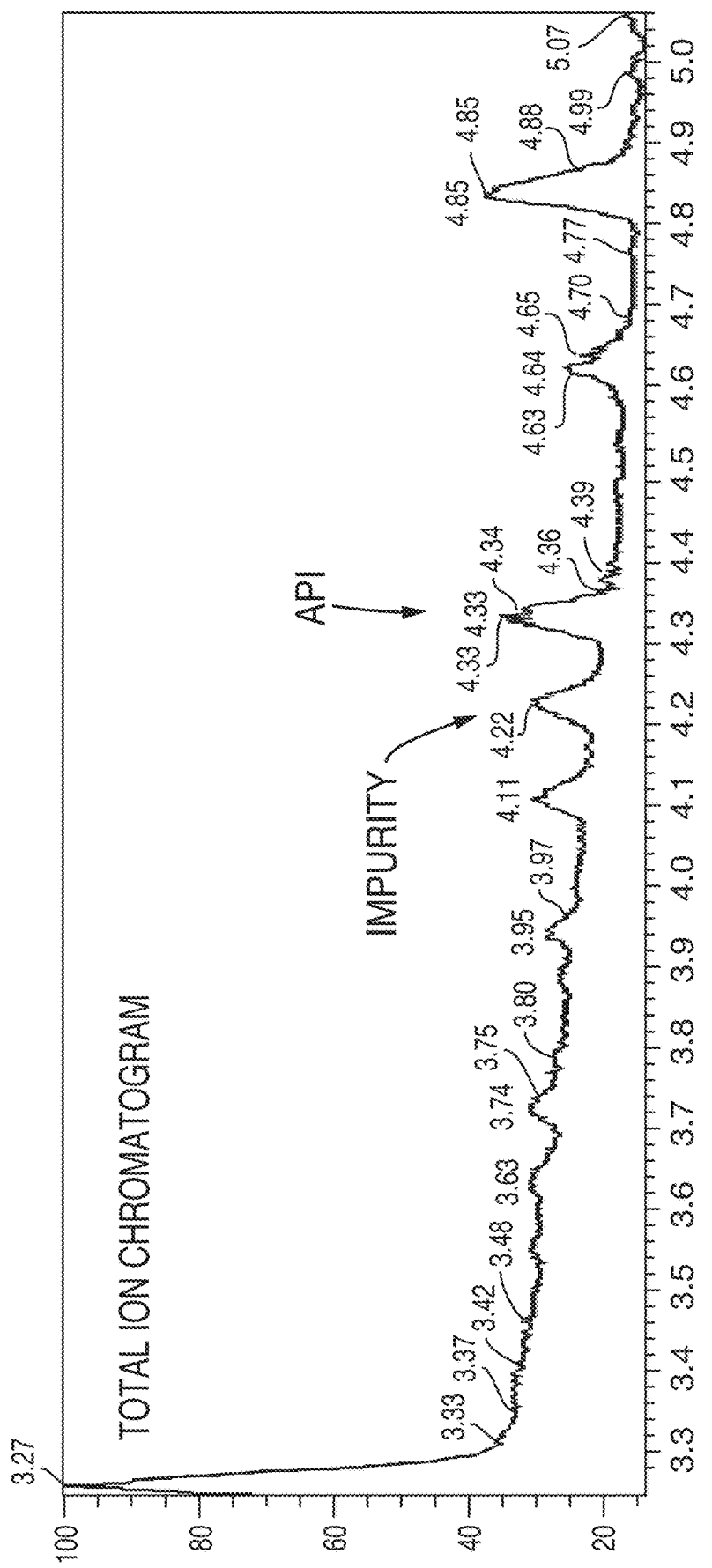
FIG. 12B is a gradient LC-single ion monitoring MS experiments unambiguously revealing the mass for the molecular ion of the unknown targeted impurity, according to an illustrative embodiment of the technology.
Figure 12C:
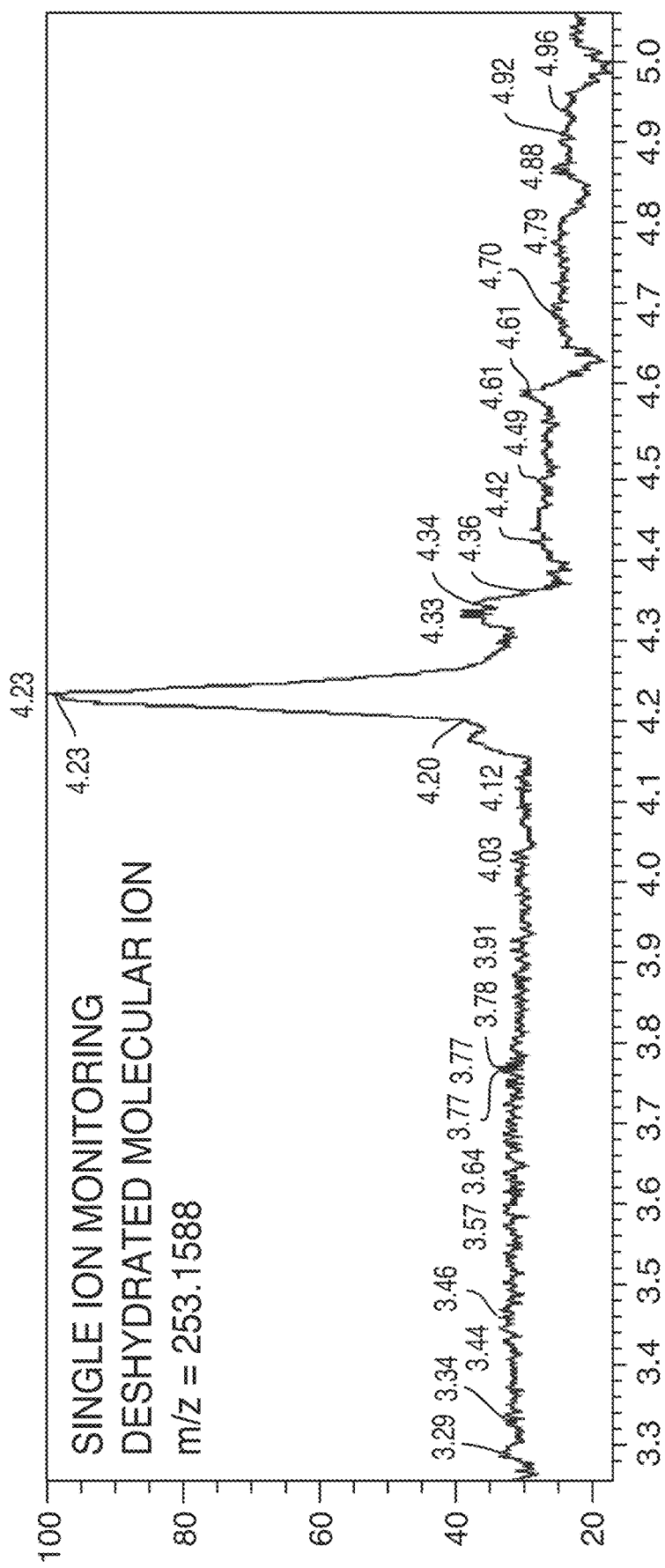
FIG. 12C is a gradient LC-single ion monitoring MS experiments unambiguously revealing the mass for the molecular ion of the dehydrated form of the unknown targeted impurity, according to an illustrative embodiment of the technology.
Figure 12D:
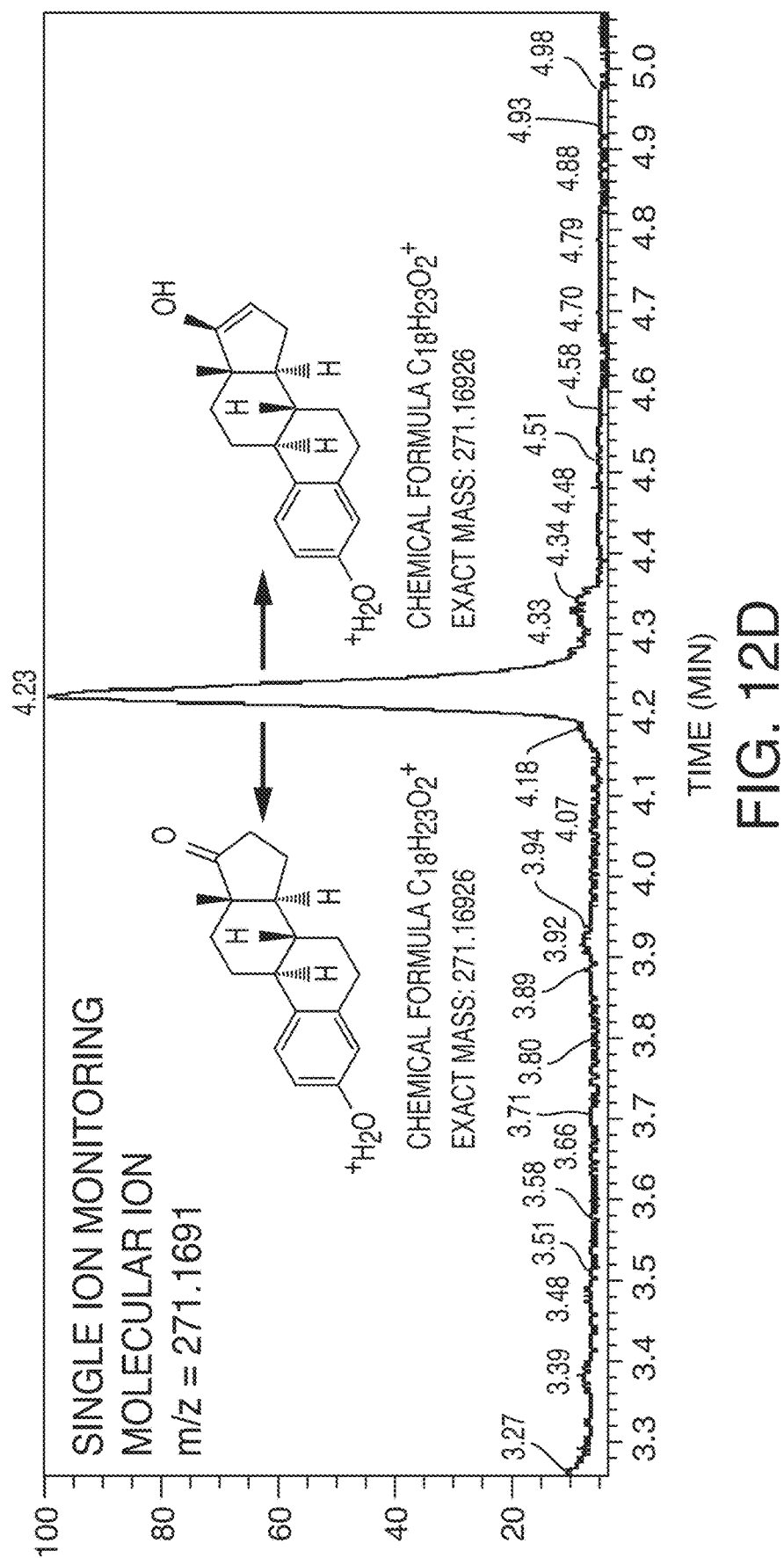
FIG. 12D is a gradient LC-single ion monitoring MS experiments unambiguously revealing the mass for the molecular ion of the dehydrated form of the unknown targeted impurity, according to an illustrative embodiment of the technology.

All the collected fractions were concentrated by a factor of about 20 after total and partial evaporation of acetonitrile and water, respectively, under low-vacuum and moderate heating (60° C.) during 45 min. FIG. 11 shows the chromatogram 1010 recorded after a 6 μL injection of a concentrated fraction (gathering a total of 12 collected fractions or 12×1 min.×0.7 mL/min=8.4 mL reduced into a 0.42 mL concentrated fraction in pure water). The reference chromatogram 1020 is for the injection of 6 μL API stock solution. The impurity-to-API peak area is increasing from 1/67 (in the API solution) to 26/1 (in the collected fractions), e.g., the targeted impurity has been enriched by a factor of about 1750 relative to the API. However, the purity of the collected fractions is still unknown because the UV signal is recorded at λ=254 nm, which maximizes the impurity-to-estradiol absorbance. Complementary LC-UV-MS experiments shown in FIGS. 12A-D estimate that the purity level of the collected fractions is rather close to 50% (see FIGS. 12A and B total PDA scan and total ion chromatogram). After complete drying of all the collected fractions, a total mass residue of 220 μg was measured indicating that the concentration of the impurity in the API solution is about 0.5×220 μg/0.060 L=1.85 mg/L. The actual production rate is then about 120 μg/252 h which is about 0.5 μg/h. The relative abundance of the impurity relative to estradiol is then about 1/5500 in the stock solution.

Identification of the Targeted Impurity

Figure 13A:
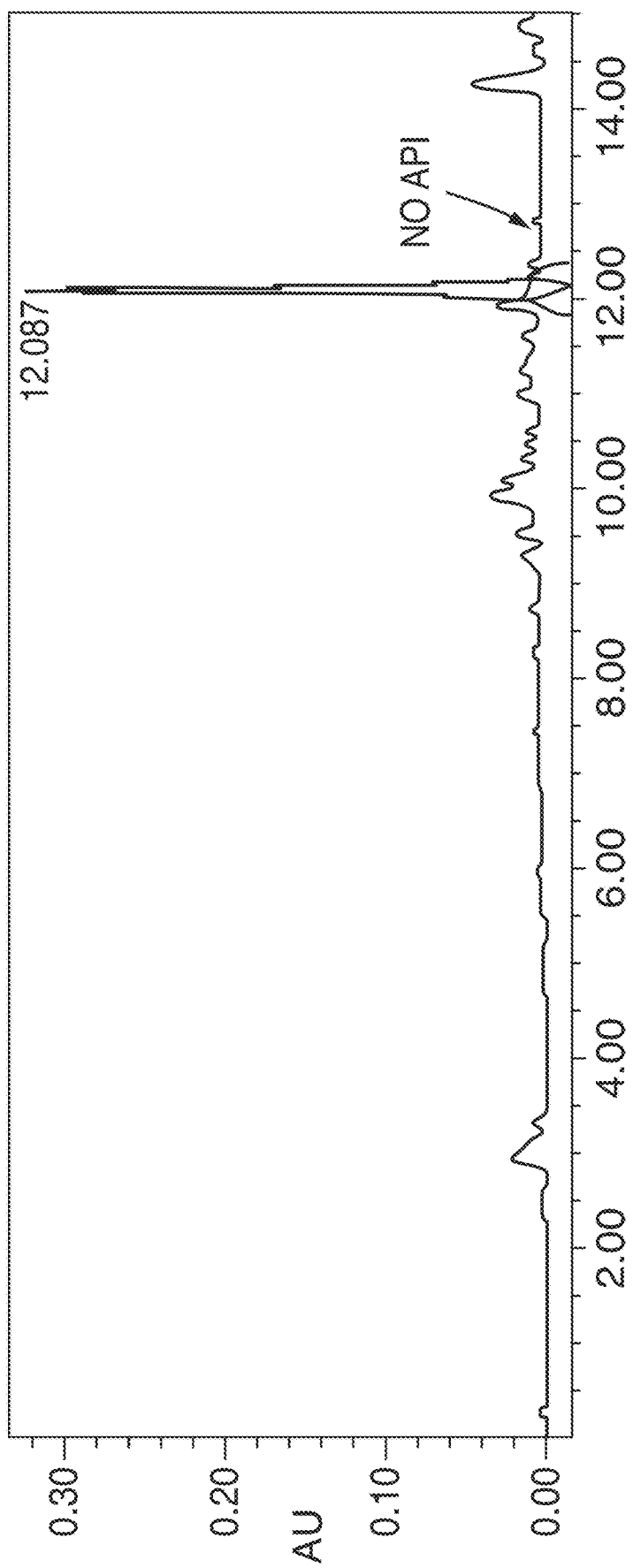
FIG. 13A is a chromatogram of the single impurity in the estradiol stock solution, according to an illustrative embodiment of the technology.
Figure 13B:
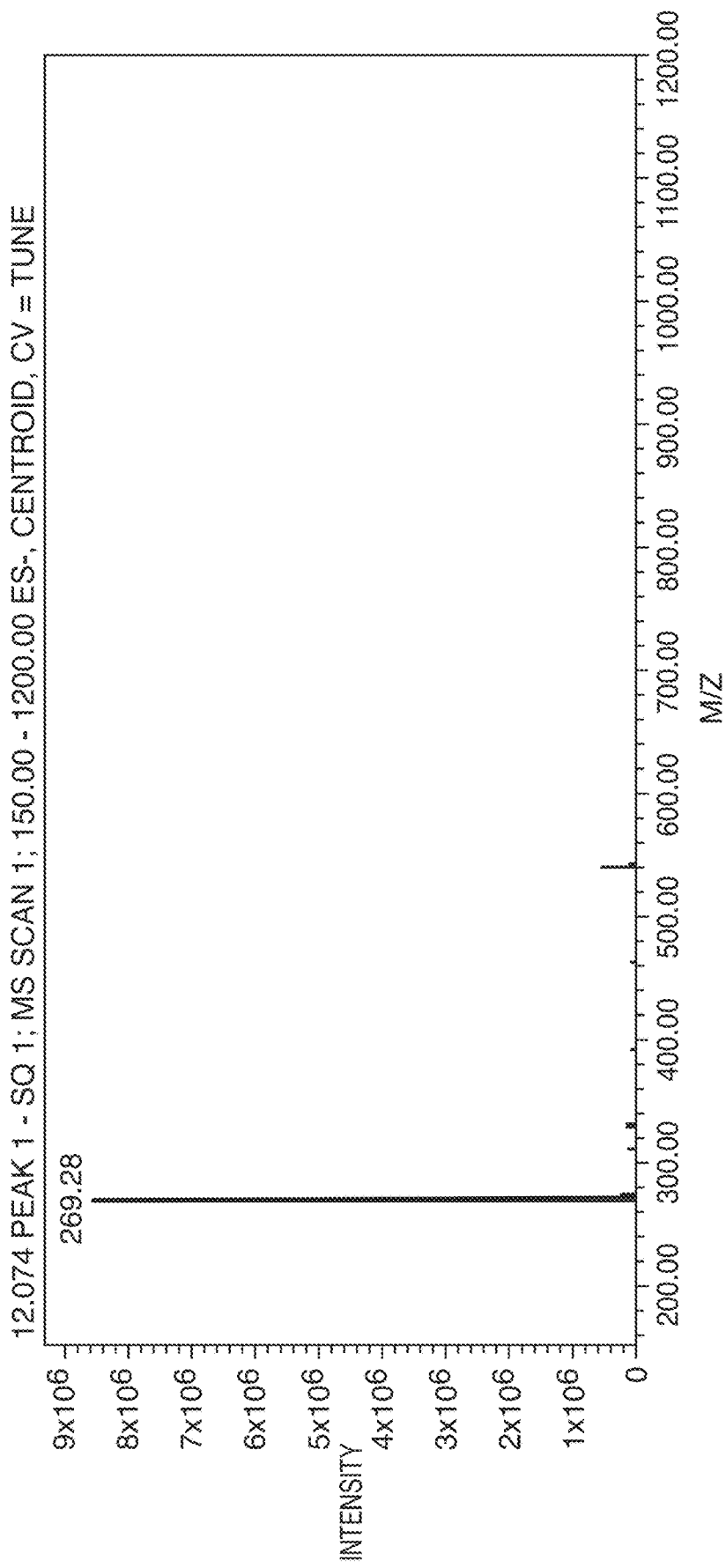
FIG. 13B is a mass spectrum of the single impurity in the estradiol stock solution having a m/z of 269.3, according to an illustrative embodiment of the technology.

The total amount and the purity of the targeted impurity extracted from the 10 g/L estradiol stock solution are 110 μg and 50%, respectively. This is clearly insufficient to perform reliable NMR experiments for unambiguous structure elucidation since a minimum mass of 1 mg and a purity of at least 90% is needed. Alternatively, gradient LC-MS (single ion monitoring) experiments were carried out to measure the mass of the impurity. The mass spectrograms of FIGS. 12C and D revealed that the experimental masses of m/z=253.1588 and 271.1691 are matching with the elution time of the impurity. The latter mass is consistent with the exact mass of estrone (M=271.16926), a derivative of estradiol in which a double bond replaces a single bond and two hydrogen atoms are eliminated. FIG. 13A shows a chromatogram of the single impurity in the estradiol stock solution and FIG. 13B shows a mass spectrum of the single impurity in the estradiol stock solution having a m/z of 269.3.

Figure 14:
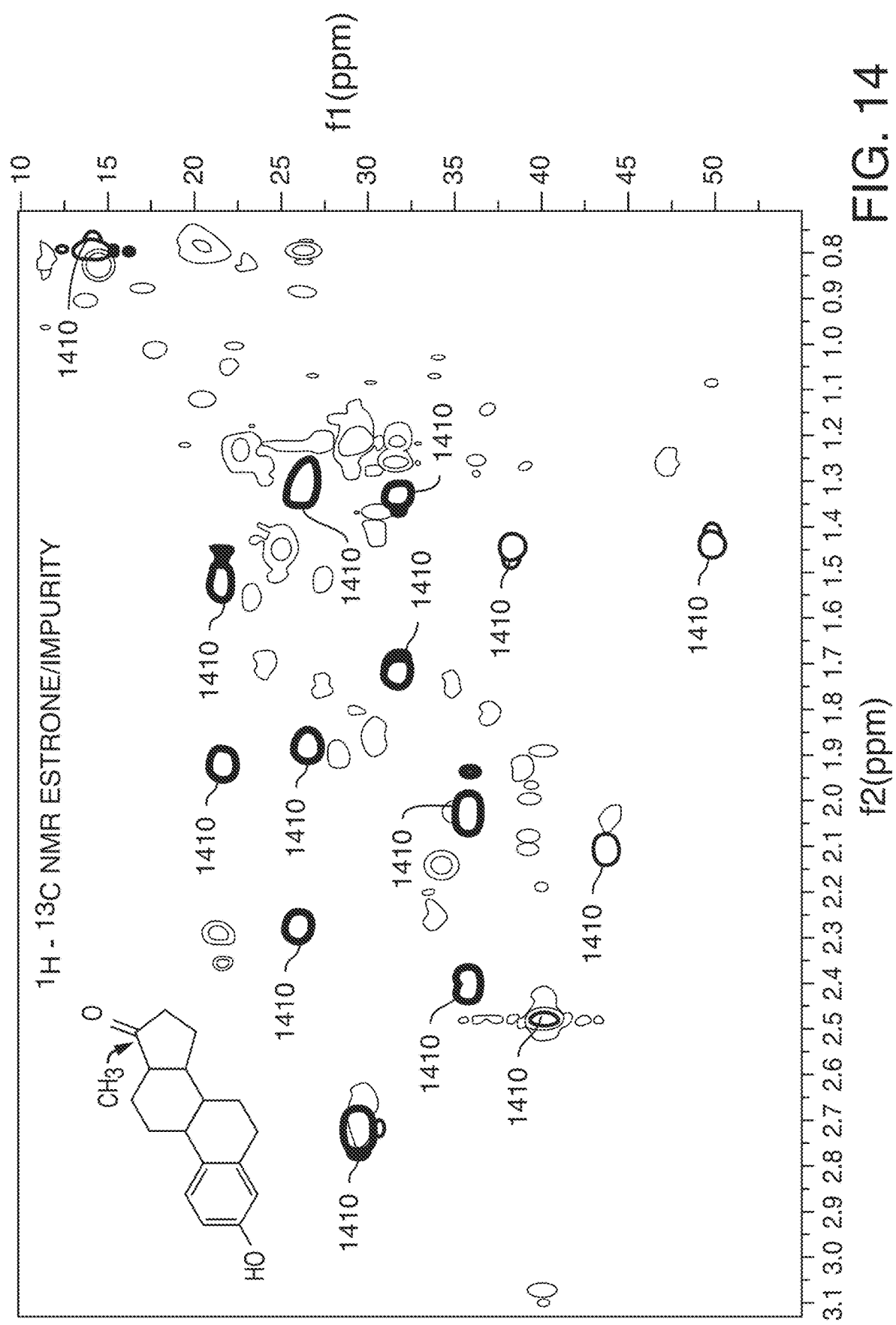
FIG. 14 is a $^1H$-$^{13}C$ NMR showing that the collected impurity is not estrone, according to an illustrative embodiment of the technology.

FIG. 14 is a $^1$H-$^{13}$C NMR showing that the collected impurity is not estrone, because there is no match between the NMR data of estrone 1410 and the NMR data of the unknown impurity, the remaining unlabeled signals on the spectrum.

Complementary UV absorption spectra (see FIGS. 15A-B) demonstrate that the targeted impurity is not estrone because its secondary maximum absorption wavelength is 260.7 nm instead of 279.6 nm. Most likely, the targeted impurity is the enol tautomeric form of estrone, which is either an intermediate or a by-product of the synthesis reaction of estradiol.

Conclusion

This Example has experimentally demonstrated that a high resolution, twin column recycling chromatography system coupled to an analytical fraction collector successively isolated significant amount of trace impurities present in concentrated API solutions. The system is particularly well suited to solve very challenging separation problems which simultaneously involve poor resolution levels (low selectivity, low efficiency), low impurity-to-API relative abundance, sample volume overload and strong sample diluents, viscous fingering, high yield, and high purity levels. The optimum production rate delivered by 4.6 mm i.d.×150 mm twin columns is about 0.5 µg/h for about 2 mg/L impurity concentration and for near co-elution (selectivity factor 1.16) with the API (10 g/L).

The delivery of higher production rate will only be possible provided that the separation/collection recycling system is scaled-up to operate at larger i.d. columns (1 cm i.d.×250 mm, 2.5 µm particles). This task is shown in Example 3 below.

The process of this example can be automated to prepare over a long-time period (days) about 1 mg of the unknown impurity. A greater number of injections can be made to prepare about 1 mg of the unknown impurity.

The process of this example can be modified to collect an impurity that has at least 90% purity to enable NMR analysis, see FIG. 14. For example, the peak collection window can be made more narrow (i.e., decrease the collection time of the impurity) to collect a purer sample for NMR analysis. In another example, the number of cycles can be increased for a fixed collection time window.

Example 3 (Experimental: Scale Up)

Example 2 was repeated with a few changes to scale-up the system and method to be able to work with larger columns, faster flow rates, and larger sample volumes. Instead of the 4.6 mm i.d. columns used in Example 2, a 7.8 mm i.d. column was used for this example. In addition, a faster flowrate of 5 mL/min was used as well injecting a larger sample volume of 1 mL per run. Moreover, the instrument pump from Example 2 was changed to an ACQUITY ARC® pump (commercially available from Waters Technologies Corporation, Milford, Mass.) for this example and the fraction collector was not an automated fraction collector, but instead was a vial. In some embodiments, when a single target impurity is to be collected, with the remainder sent to trash, a single vial can be used to collect the single target impurity. In other embodiments, where multiple targeted impurities are in the API sample, a series of recycling sequences (as many as the number of impurities) can be used, as well as a fraction collector (or multiple vials).

By combining these three increases in column size, flowrate and sample volume, the production rate of the pure impurity can be increased by a factor of 50 and the collection of 1 mg of impurity with at least 90% purity can be completed in approximately 15 hours. The remainder of the parameters are the same as those in Example 2.

The standard operating procedure is a four-step process. First, the user measures the retention times of both the impurity and the API under analytical conditions (e.g., 50 µL injection). FIG. 14 is a chromatogram showing the measurement of the retention times of the impurity and API under an analytical injection of 50 µL.

Figure 15A:
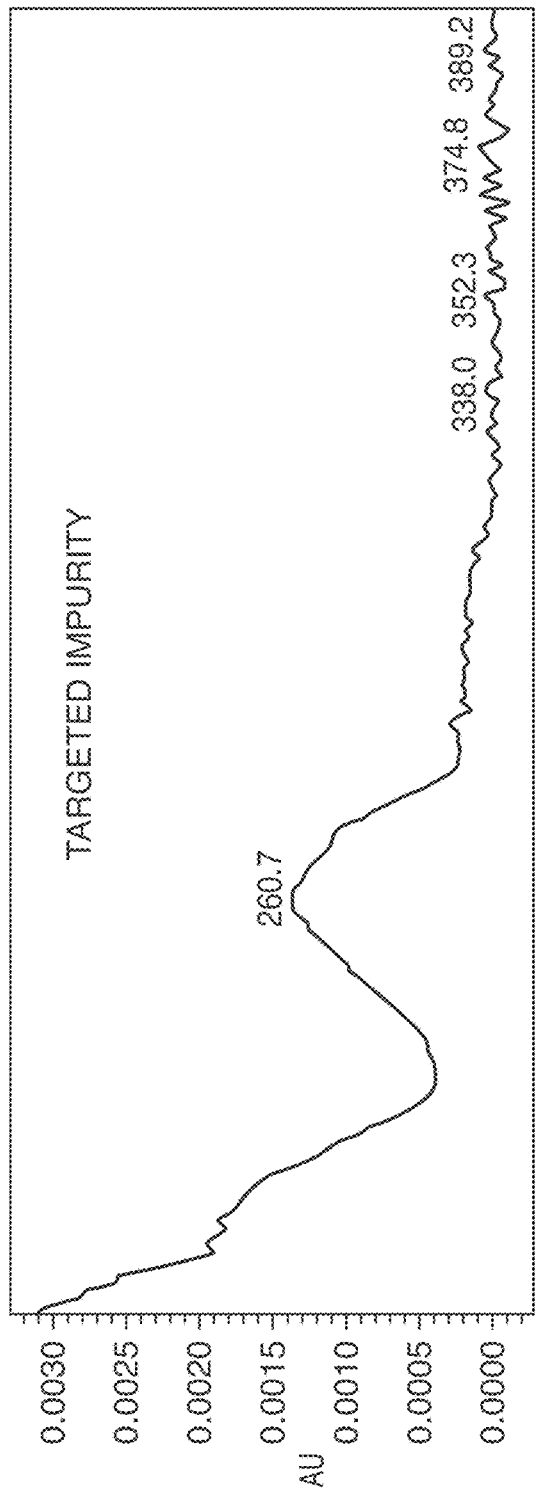
FIG. 15A shows the unambiguous identification of the unknown targeted impurity as the enol tautomeric form of estrone from the shift of the maximum UV absorption wavelength from 279.6 nm to 260.7 nm when compared to FIG. 15B, according to an illustrative embodiment of the technology.
Figure 15B:
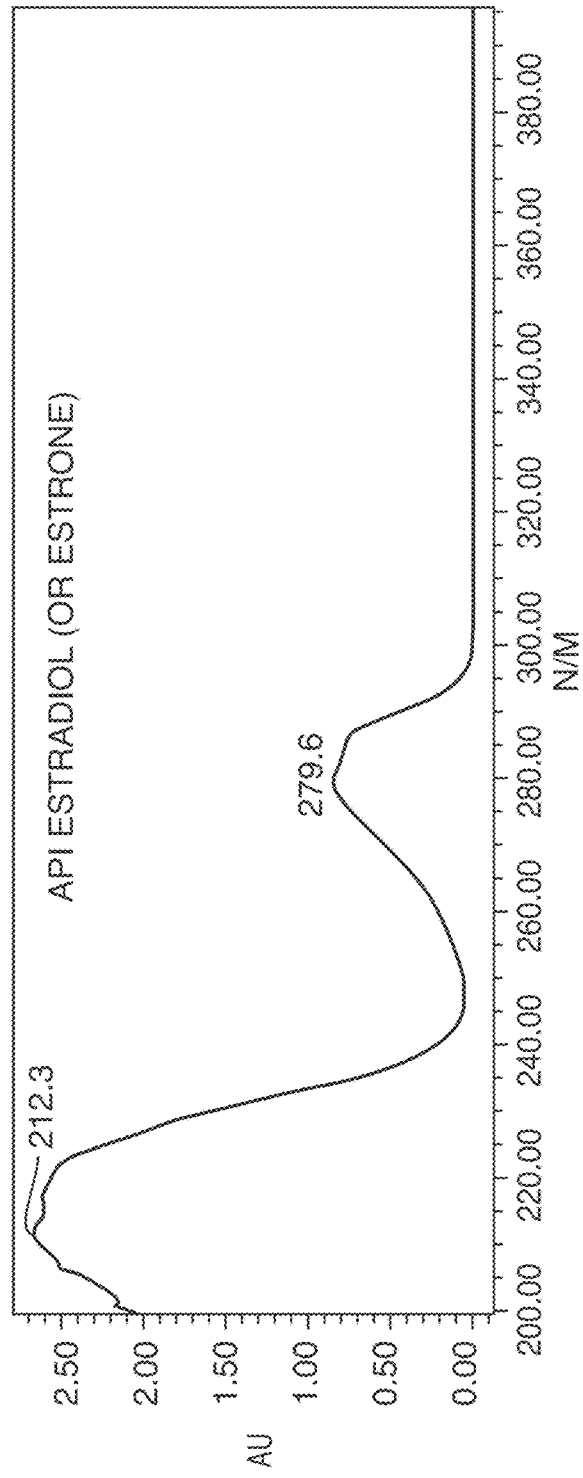
FIG. 15B shows the unambiguous identification of the unknown targeted impurity as the enol tautomeric form of estrone from the shift of the maximum UV absorption wavelength from 279.6 nm to 260.7 nm when compared to FIG. 15A, according to an illustrative embodiment of the technology.

Next, the user measures the retention times of the both the front and rear part of the API band at half height under preparative conditions (e.g., 1000 µL injection). FIG. 15A-B shows a chromatogram of the measurement of the retention times of both the front and rear part of the API band at half height under preparative conditions.

Figure 16:
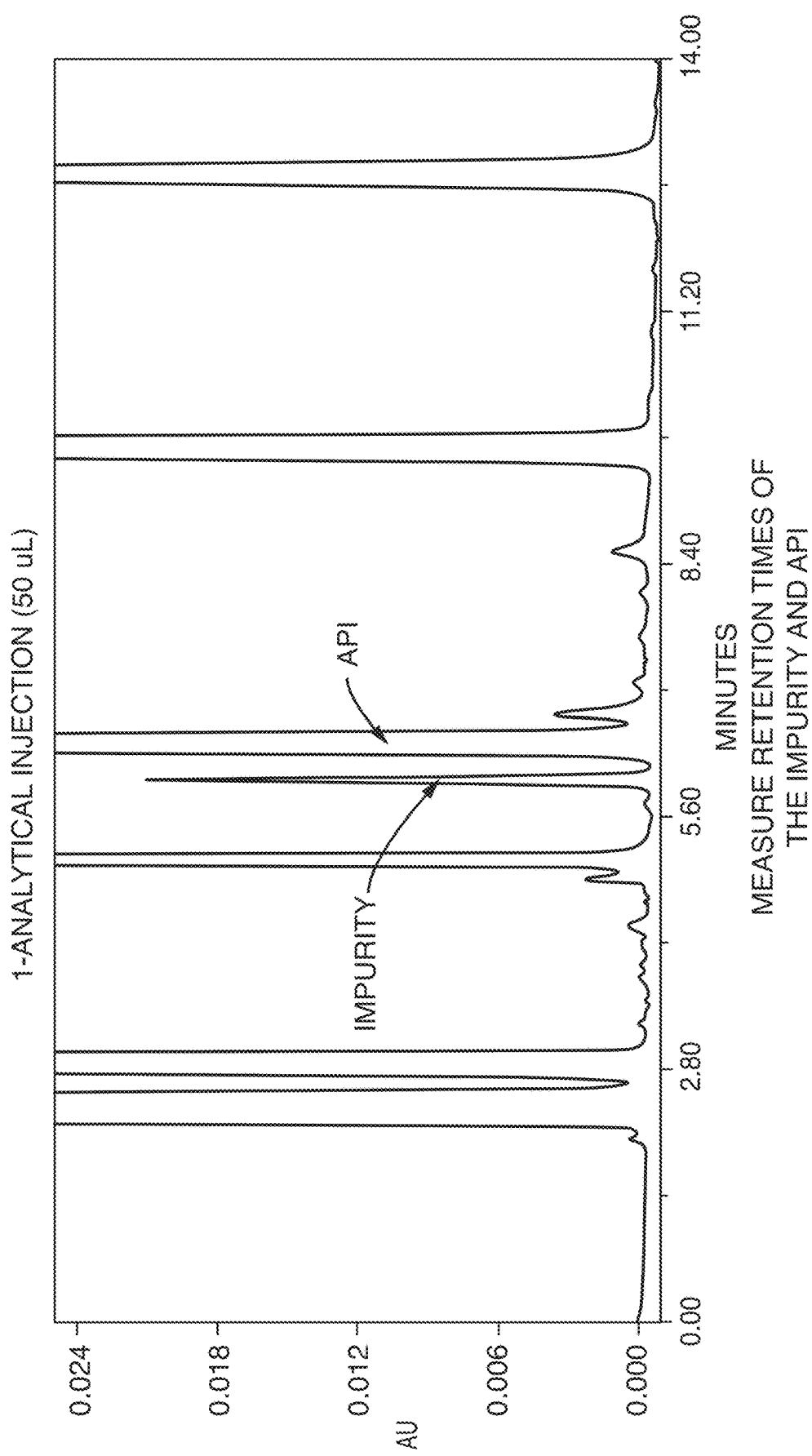
FIG. 16 is a chromatogram showing the measurement of the retention times of the impurity and API under an analytical injection of 50 µL, according to an illustrative embodiment of the technology.

The user then tests the recycling process for three cycles (N=3). The list of recycling and collection times are automatically given in the method to be run. The user then tests the recycling process by incrementing the number of cycles by two under the impurity band is separation by more than 0.5 minutes from the API band. FIG. 16 shows a chromatogram of the impurity and API band separated by more than 0.5 minutes after eight cycles.

Figure 17:
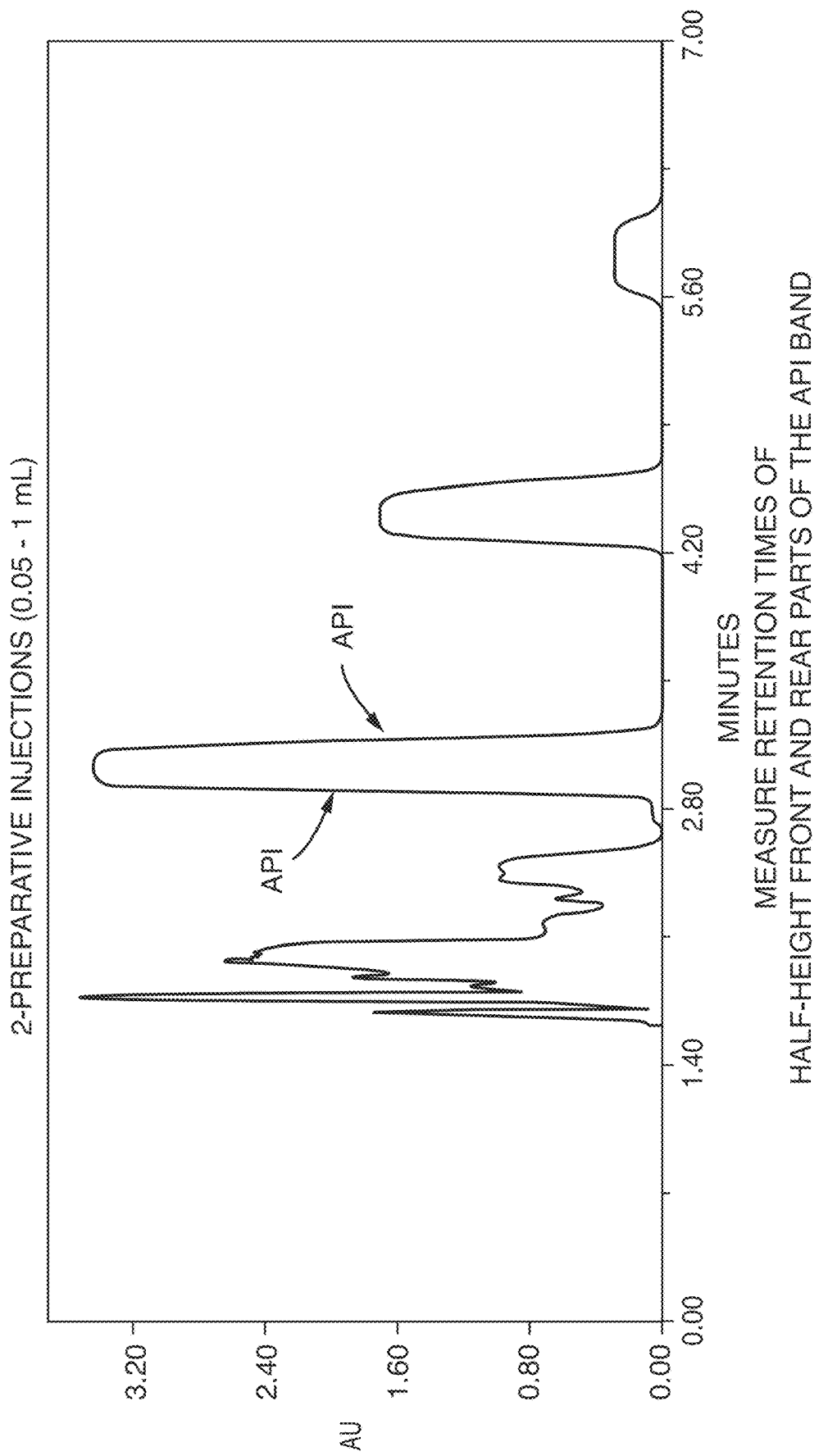
FIG. 17 shows a chromatogram of the measurement of the retention times of both the front and rear part of the API band at half height under preparative conditions, according to an illustrative embodiment of the technology.
Figure 18:
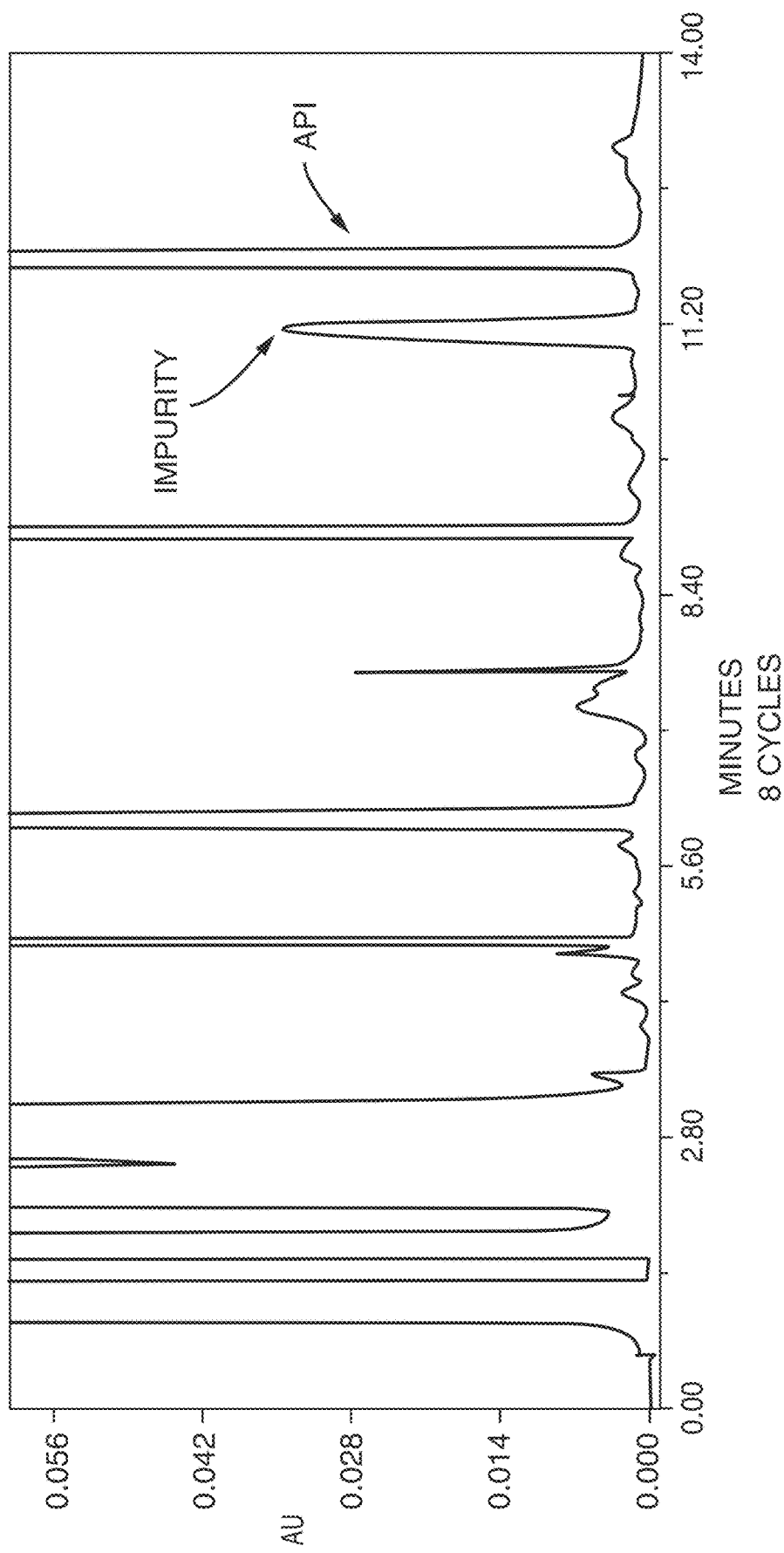
FIG. 18 shows a chromatogram of the impurity and API band separated by more than 0.5 minutes after eight cycles, according to an illustrative embodiment of the technology.
Figure 19:
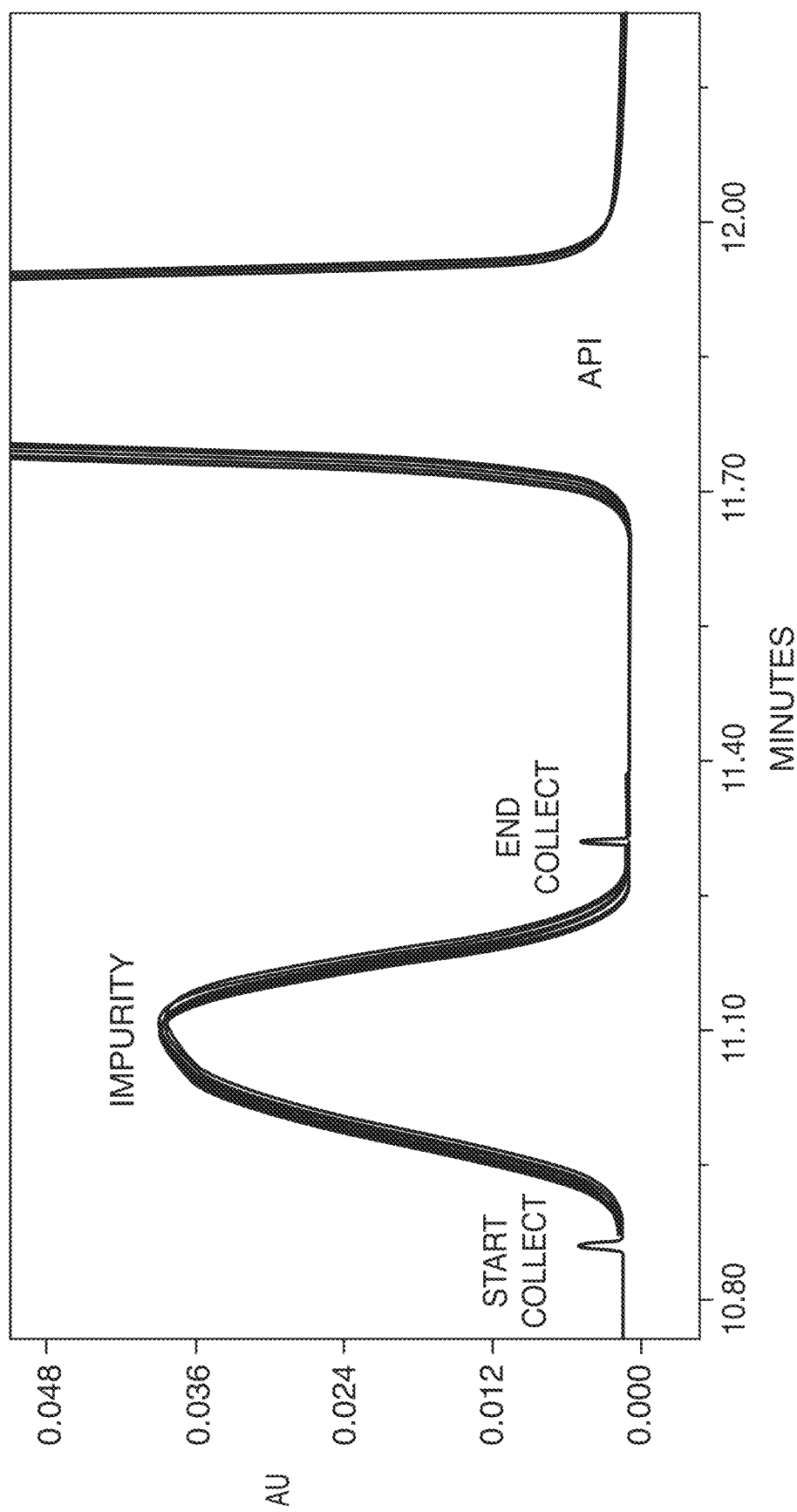
FIG. 19 is a chromatogram showing the start and end times of the collection of the impurity to obtain 1 mg of impurity with at least 90% purity, according to an illustrative embodiment of the technology.

The user then repeats the last successful run as many times as is necessary to get 1 mg of impurity with at least 90% purity. FIG. 17 is a chromatogram showing the start and end times of the collection of the impurity to obtain 1 mg of impurity with at least 90% purity.

The scaled-up system can be integrated to be an easy to assembly system. For example, the recycling system can be made of four pre-existing modules, a pump module, an injector module, a two-column oven module and a PDA detector module. The recycling and collection valves are located in the two-column oven module. For example, FIG. 1 shows three of the modules, or subunits, an injection subunit (e.g., injector module) 102, a recycling subunit (e.g., two-column oven module) 104, and a collection subunit (e.g., PDA detector module) 106. The pump 114 is shown in FIG. 1 as being part of the injection subunit 102. In some embodiments, the pump is a separate module/subunit.

Those skilled in the art will recognize, or be able to ascertain using no more than routine experimentation, numerous equivalents to the specific procedures described herein. Such equivalents were considered to be within the scope of this technology and are covered by the following claims. The contents or all references, issued patents, and published patent applications cited throughout this application are hereby incorporated by reference.

What is claimed is:

1. A recycling chromatography method comprising the steps of:
   (i) injecting a sample into a mobile phase flow stream of a chromatography system to create a combined flow stream, the sample comprising an active pharmaceutical ingredient and at least one impurity, wherein the selectivity factor of the active pharmaceutical ingredient and the at least one impurity is <1.2, and wherein the amount of the at least one impurity in the sample is less than 0.1% by weight, the chromatography system comprising:
      a first chromatographic column and a second chromatographic column positioned in series;
      a first valve in fluid communication with the first chromatographic column and the second chromatographic column;
      a heater in communication with the first chromatographic column and the second chromatographic column;
      a fraction collector in fluid communication with the first chromatographic column and the second chromatographic column; and
      a second valve positioned before the fraction collector;
   (ii) recycling the combined flow stream from the first chromatographic column to the second chromatographic column and from the second chromatographic column to the first chromatographic column by switching the first valve until a baseline resolution is achieved to separate the at least one impurity from the active pharmaceutical ingredient; and
   (iii) collecting the at least one impurity in the fraction collector; and
   (iv) repeating steps (i)-(iii) until at least about 1 mg of the at least one impurity is collected in the fraction collector.

2. The method of claim 1, wherein the chromatography system is a liquid chromatography system, a gas chromatography system, a supercritical fluid chromatography system, or a capillary electrophoresis chromatography system.

3. The method of claim 2, wherein the chromatography system is a semi-preparative chromatography system.

4. The method of claim 1, wherein the chromatography system is a semi-preparative, high performance liquid chromatography system.

5. The method of claim 1, wherein the first chromatographic column and the second chromatographic column are identical.

6. The method of claim 1, wherein the first valve is a six-port or an eight-port valve.

7. The method of claim 1, wherein the second valve is a four-port valve.

8. The method of claim 1, wherein fraction collector collects about 1 mg of the at least one impurity at a purity level of at least 90%.

9. The method of claim 1, further comprising determining the chemical structure of the at least one impurity.

10. The method of claim 9, wherein the chemical structure of the at least one impurity is determined by nuclear magnetic resonance.

11. The method of claim 1, further comprising pre-determining a number of valve switches to achieve the baseline resolution to separate the at least one impurity from the active pharmaceutical ingredient.

12. The method of claim 1, wherein the heater maintains a column temperature between about 20° C. to about 100° C.

13. The method of claim 1, wherein the combined flow stream has a flow rate between about 0.5 mL/min and about 2 mL/min and the first chromatographic column and the second chromatographic column each have an inner diameter of about 4.6 mm.

14. The method of claim 1, wherein the combined flow stream has a flow rate between about 2 mL/min and about 10 mL/min and the first chromatographic column and the second chromatographic column each have an inner diameter of about 1 cm.

15. The method of claim 1, wherein the chromatography system further comprises a detector positioned between the first chromatographic column and the second chromatographic column.

16. The method of claim 1, wherein the chromatography system further comprises a detector positioned before the fraction collector.

17. The method of claim 1, wherein the collected at least one impurity is about 90% pure.

18. The method of claim 1, wherein the collected at least one impurity is about 95% pure.

19. The method of claim 1, wherein the collected at least one impurity is about 99% pure.

* * * * *